US012639794B2

(12) United States Patent
Peng et al.

(10) Patent No.: US 12,639,794 B2
(45) Date of Patent: May 26, 2026

(54) IMAGE NOISE REDUCTION AND FILTER DATA PROCESSING METHOD AND APPARATUS, AND COMPUTER DEVICE

(71) Applicant: Tencent Technology (Shenzhen) Company Limited, Shenzhen (CN)

(72) Inventors: Chengwei Peng, Shenzhen (CN); Yang Yi, Shenzhen (CN); Yi Zhou, Shenzhen (CN); Xiaoming Yu, Shenzhen (CN); Yiting Xu, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 269 days.

(21) Appl. No.: 18/630,545

(22) Filed: Apr. 9, 2024

(65) Prior Publication Data

US 2024/0257319 A1     Aug. 1, 2024

Related U.S. Application Data

(63) Continuation of application No. PCT/CN2023/084674, filed on Mar. 29, 2023.

(30) Foreign Application Priority Data

May 27, 2022     (CN) .......................... 202210590036.4

(51) Int. Cl.
*G06T 5/70*          (2024.01)
*G06T 3/40*          (2006.01)
(Continued)

(52) U.S. Cl.
CPC .................. G06T 5/70 (2024.01); G06T 3/40 (2013.01); G06T 5/20 (2013.01); G06T 7/11 (2017.01);
(Continued)

(58) Field of Classification Search
CPC .... G06T 5/70; G06T 3/40; G06T 5/20; G06T 7/11; G06T 7/248; G06T 7/90;
(Continued)

(56) References Cited

U.S. PATENT DOCUMENTS 12,229,923 B2 * 2/2025 Nozaki ...................... G06T 5/70
12,307,659 B2 * 5/2025 Iwase .................... G06T 7/0012
(Continued)

FOREIGN PATENT DOCUMENTS

CN           1901620 A      1/2007
CN          102238316 A     11/2011
(Continued)

OTHER PUBLICATIONS

European Search Report dated Jun. 11, 2025 in Application No. 23810659.5.
(Continued)

*Primary Examiner* — Tom Y Lu
(74) *Attorney, Agent, or Firm* — Sughrue Mion, PLLC

(57)          ABSTRACT

An image noise reduction method including: obtaining a first image to be processed and a second image as a reference image; obtaining a block of the first image by dividing the first image; determining a motion intensity of the block based on the second image; obtaining filter coefficient description information matching the motion intensity based on: a first pixel difference of a first pixel point value of the first image and a second pixel point value of the second image, and a filter coefficient; obtaining a target pixel difference between a third pixel point value of the block and a fourth pixel point value of the second image; determining a target filter coefficient corresponding to the target pixel difference based on the filter coefficient description information; and determining a target noise reduction image of the first image based on the target filter coefficient.

20 Claims, 9 Drawing Sheets

(51) Int. Cl.

| | |
|---|---|
| *G06T 5/20* | (2006.01) |
| *G06T 7/11* | (2017.01) |
| *G06T 7/246* | (2017.01) |
| *G06T 7/90* | (2017.01) |

(52) U.S. Cl.
CPC ................ *G06T 7/248* (2017.01); *G06T 7/90* (2017.01); *G06T 2207/10016* (2013.01); *G06T 2207/10024* (2013.01); *G06T 2207/20021* (2013.01)

(58) Field of Classification Search
CPC . G06T 2207/10016; G06T 2207/10024; G06T 2207/20021; G06T 2207/20182; G06T 7/0002; G06T 7/246; H04N 5/21
See application file for complete search history.

(56) References Cited

U.S. PATENT DOCUMENTS

| | | | |
|---|---|---|---|
| 2002/0080882 A1 | 6/2002 | Kitagawa | |
| 2020/0374564 A1 | 11/2020 | Nagori et al. | |
| 2021/0342978 A1* | 11/2021 | Yu | G06T 5/70 |
| 2024/0046426 A1* | 2/2024 | Jung | G06T 5/70 |

FOREIGN PATENT DOCUMENTS

| | | |
|---|---|---|
| CN | 109859126 A | 6/2019 |
| CN | 111652814 A | 9/2020 |
| CN | 113612996 A | 11/2021 |
| CN | 115131229 A | 9/2022 |

OTHER PUBLICATIONS

International Search Report dated Jun. 23, 2023 in Application No. PCT/CN2023/084674.
Written Opinion of the International Searching Authority dated Jun. 23, 2023 in Application No. PCT/CN2023/084674.
Communication dated Mar. 18, 2025 in Chinese Application No. 202210590036.4.

* cited by examiner

~ 802

| Obtain a plurality of pieces of reference motion intensity information, and determine a pixel difference distribution range |

~ 804

| Determine, based on each piece of reference motion intensity information, filter coefficient representation values under a plurality of pixel differences in the pixel difference distribution range |

~ 806

| Establish a correspondence between each filter coefficient representation value and a corresponding pixel difference |

~ 808

| Form filter coefficient description information by using correspondences of filter coefficient representation values determined based on a same piece of reference motion intensity information, to obtain filter coefficient description information corresponding to each piece of reference motion intensity information |

FIG. 8

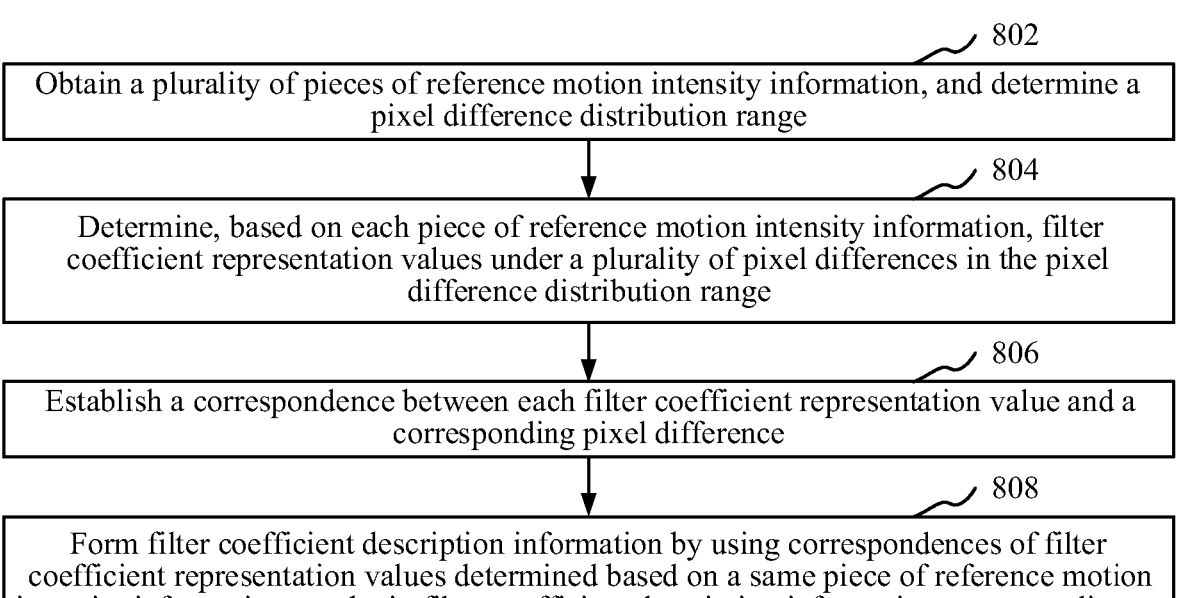

(a)

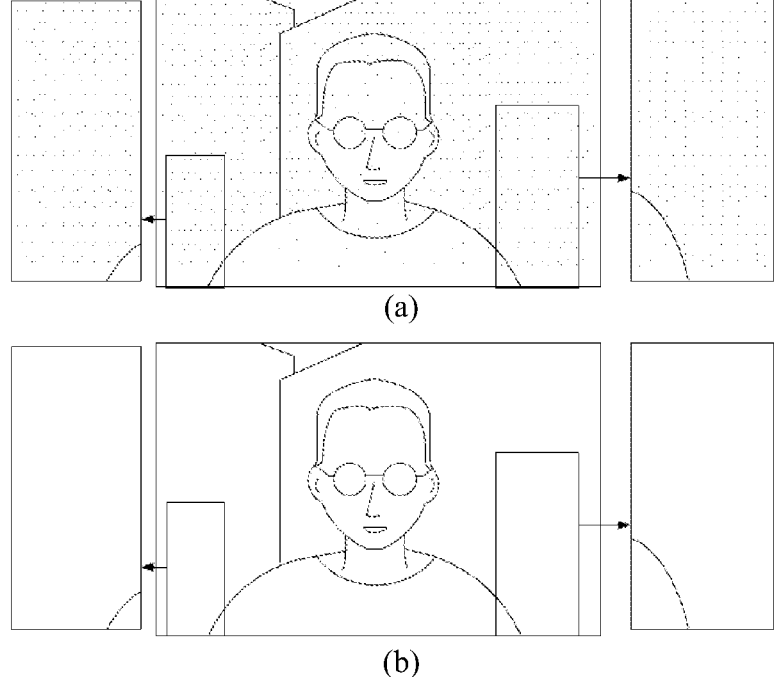

IMAGE NOISE REDUCTION AND FILTER DATA PROCESSING METHOD AND APPARATUS, AND COMPUTER DEVICE

CROSS-REFERENCE TO RELATED APPLICATIONS

This application is a continuation application of International Application No. PCT/CN2023/084674 filed on Mar. 29, 2023, which claims priority to Chinese Patent Application No. 202210590036.4 filed with the China National Intellectual Property Administration on May 27, 2022, the disclosures of each being incorporated by reference herein in their entireties.

FIELD

The disclosure relates to the field of image processing technologies, and in particular, to an image noise reduction and filter data processing method and apparatus, a computer device, a storage medium, and a computer program product.

BACKGROUND

With the development of image processing technologies, an image noise reduction technology emerges. The image noise reduction technology can reduce image noise information caused by hardware errors and unstable light sources. In many scenarios, image noise reduction may be required. For example, during video acquisition, various types of noise are mixed in an acquired image sequence. To improve a visual effect of a video image, and improve compression efficiency of the video image or reduce a bandwidth, noise reduction may be required for the video image.

In related technologies, when noise reduction is performed on an image, there is often a problem of a poor noise reduction effect.

SUMMARY

According to some embodiments, an image noise reduction method and apparatus, a computer device, a computer-readable storage medium, and a computer program product; and a filter data processing method and apparatus, a computer device, a computer-readable storage medium, and a computer program product are provided.

According to some embodiments, an image noise reduction method, performed by a computer device includes: obtaining a first image to be processed and second image as a reference image; obtaining a block of the first image by dividing the first image; determining a motion intensity of the block of the first image based on the second image; obtaining filter coefficient description information matching the motion intensity based on: a first pixel difference of a first pixel point value of the first image, and a filter coefficient; obtaining a target pixel difference between a third pixel point value of the block of the first image and a fourth pixel point value of the second image; determining a target filter coefficient corresponding to the target pixel difference based on the filter coefficient description information; and determining a target noise reduction image of the first image based on the target filter coefficient, wherein the filter coefficient is negatively correlated with the first pixel difference, wherein a degree of change of the filter coefficient is positively correlated with the motion intensity, and wherein the filter coefficient is a value for representing the filter coefficient or is obtained by performing a calculation on the value for representing the filter coefficient.

According to some embodiments, an image noise reduction apparatus includes: at least one memory configured to store computer program code; at least one processor configured to read the program code and operate as instructed by the program code, the program code including: image obtaining code configured to cause at least one of the at least one processor to obtain a first image to be processed and a second image as a reference image; motion intensity determining code configured to cause at least one of the at least one processor to obtain a block of the first image by dividing the first image; and determine motion intensity of the block of the first image based on the second image; description information obtaining code configured to cause at least one of the at least one processor to obtain filter coefficient description information matching the motion intensity; filter coefficient determining code configured to cause at least one of the at least one processor to obtain a target pixel difference between a third pixel point value of the block of the first image and a fourth pixel point value of the second image; and determine a target filter coefficient corresponding to the target pixel difference based on the filter coefficient description information; and noise reduction image determining code configured to cause at least one of the at least one processor to determine a target noise reduction image of the first image based on the target filter coefficient, wherein the filter coefficient description information is based on: a first pixel difference of a first pixel point value of the first image and a second pixel point value of the second image, and a filter coefficient, wherein the filter coefficient is negatively correlated with the first pixel difference, wherein a degree of change of the filter coefficient is positively correlated with the motion intensity, and wherein the filter coefficient is a value for representing the filter coefficient or is obtained by performing a calculation on the value for representing the filter coefficient.

According to some embodiments, a non-transitory computer-readable storage medium, storing computer code which, when executed by at least one processor, may cause the at least one processor to at least: obtain a first image to be processed and a second image as a reference image; obtain a block of the first image by dividing the first image; determine motion intensity of the block of the first image based on the second image; obtain filter coefficient description information matching the motion intensity; obtain a target pixel difference between a third pixel point value of the block of the first image and a fourth pixel point value of the second image; determine a target filter coefficient corresponding to the target pixel difference based on the filter coefficient description information; and determine a target noise reduction image of the first image based on the target filter coefficient, wherein the filter coefficient description information is based on: a first pixel difference of a first pixel point value of the first image and a second pixel point value of the second image, and a filter coefficient, wherein the filter coefficient is negatively correlated with the first pixel difference, wherein a degree of change of the filter coefficient is positively correlated with the motion intensity, and wherein the filter coefficient is a value for representing the filter coefficient or is obtained by performing a calculation on the value for representing the filter coefficient.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 8 is a schematic flowchart of a filter data processing method in some embodiments.

FIG. 9 is a schematic diagram of an effect of an image noise reduction method in some embodiments.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Some embodiments are described with reference to the accompanying drawings. The described embodiments are examples of some embodiments. All other embodiments obtained by a person skilled in the art based on the embodiments without creative efforts shall fall within the protection scope of this application.

Figure 1:
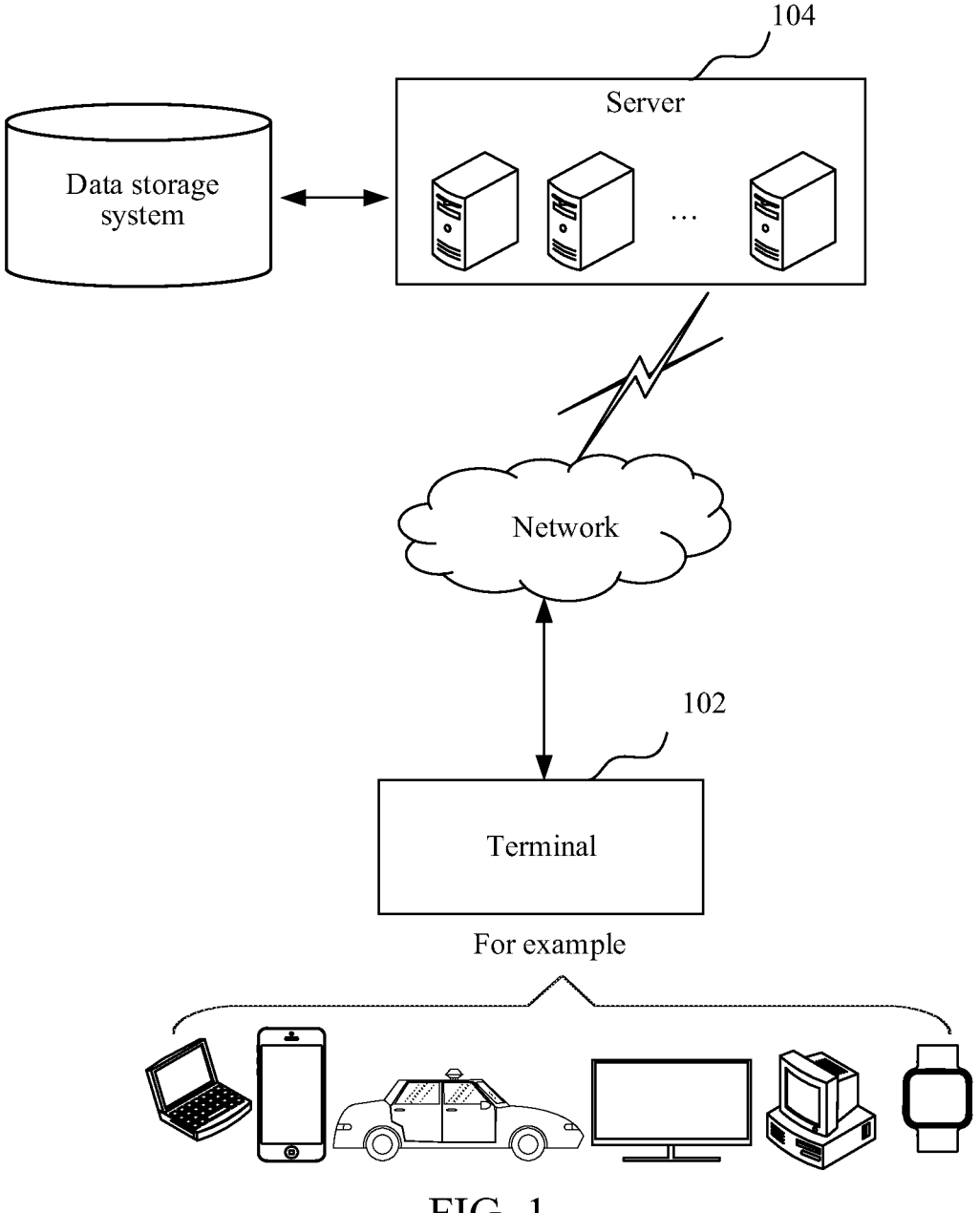
FIG. 1 is a diagram of an application environment of an image noise reduction method and a filter data processing method in some embodiments.

An image noise reduction method and a filter data processing method provided in some embodiments may be applied to an application environment shown in FIG. 1. A terminal 102 communicates with a server 104 through a network. A data storage system may store data that the server 104 processes, for example, may store a target noise reduction image obtained by performing noise reduction. The data storage system may be integrated on the server 104, or may be placed on a cloud or another server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform. The terminal may be a smart phone, a tablet computer, a notebook computer, a desktop computer, an intelligent voice interaction device, a smart home appliance, an in-vehicle terminal, an aircraft, or the like, but is not limited thereto. The terminal and the server may be directly or indirectly connected in a wired or wireless communication manner but is not limited thereto.

It may be understood that, the image noise reduction method and the filter data processing method provided in some embodiments may be performed by the terminal 102, or may be performed by the server 104, or may be collaboratively performed by the terminal 102 and the server 104. For example, the terminal 102 may acquire a to-be-processed image, and send the to-be-processed image to the server. The server further obtains a reference image corresponding to the to-be-processed image; then determines motion intensity of a to-be-processed block in the to-be-processed image according to the reference image; obtains filter coefficient description information matching the motion intensity, and the filter coefficient description information may be configured for describing a correspondence between a pixel difference and a filter coefficient representation value; obtains a target pixel difference between a pixel point in the to-be-processed block and a pixel point at a corresponding position in the reference image, to determine, based on the filter coefficient description information, a target filter coefficient representation value that has a correspondence with the target pixel difference; and determines a target noise reduction image corresponding to the to-be-processed image based on the target filter coefficient representation value. Finally, the server 104 may return the target noise reduction image to the terminal 102.

Figure 2:
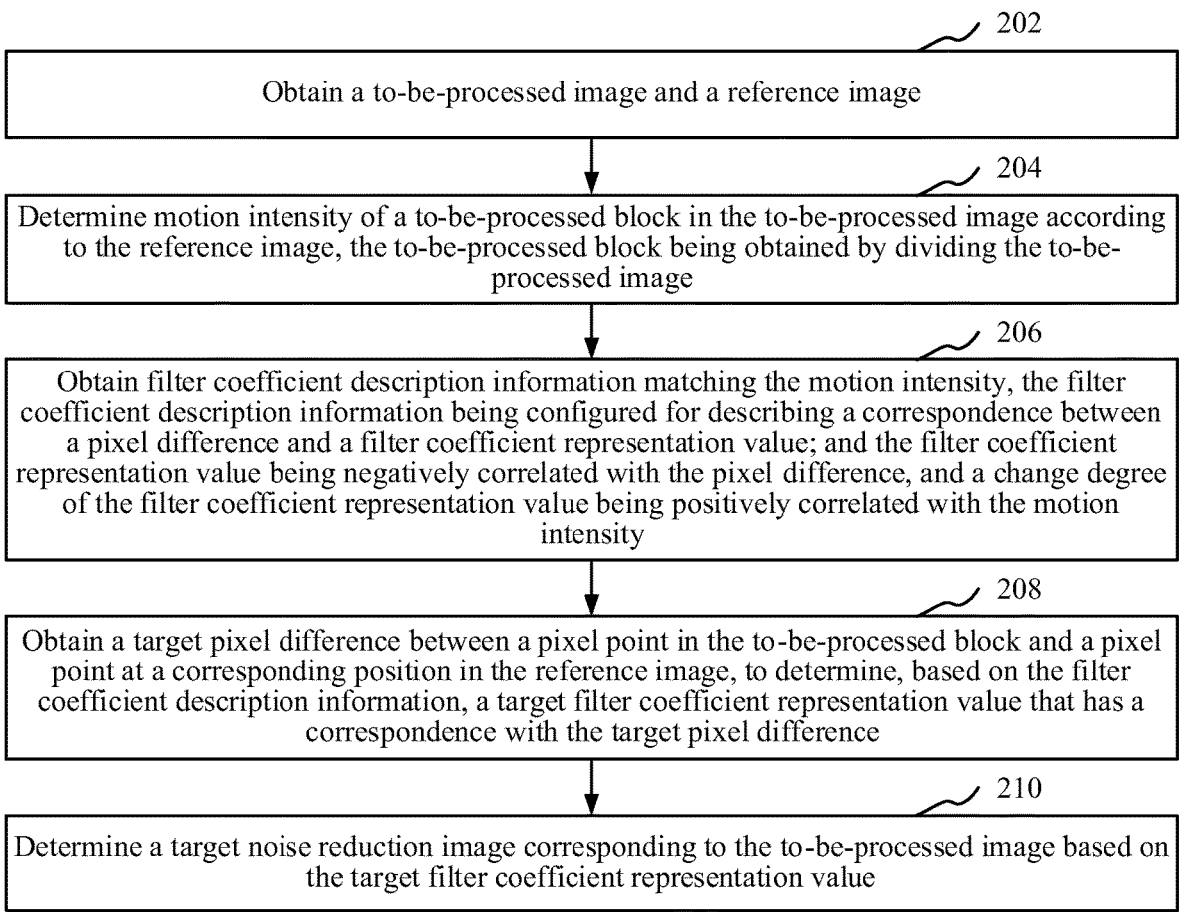
FIG. 2 is a schematic flowchart of an image noise reduction method in some embodiments.

In some embodiments, as shown in FIG. 2, an image noise reduction method is provided, and may be performed by a computer device. The computer device may be the terminal 102 in FIG. 1, or may be the server 104 in FIG. 1, or may be a system formed by the terminal 102 and the server 104. The image noise reduction method includes the following operations.

Operation 202: Obtain a to-be-processed image and a reference image.

The to-be-processed image is an image on which noise reduction may be performed. The to-be-processed image may be an image acquired by the computer device, or an image that is received by the computer device through a network and that is acquired by another computer device. The to-be-processed image may be a video frame in a video.

The reference image is an image used as a reference for performing time domain filtering on the to-be-processed image. The reference image and the to-be-processed image may include a same foreground object. The reference image may be an image obtained through noise reduction processing. When the to-be-processed image is an image in a target video on which noise reduction is to be performed, the reference image may be an image obtained by performing noise reduction processing on a forward video frame of the to-be-processed image. The noise reduction processing herein may be time domain filtering processing or spatial filtering processing. In some embodiments, the noise reduction processing may first perform time domain filtering, and then perform spatial filtering processing.

After the to-be-processed image is determined, the computer device may obtain one or more reference images corresponding to the to-be-processed image, and then may perform filtering processing on the to-be-processed image based on the reference image, to implement noise reduction of the to-be-processed image. "A plurality of" mentioned in some embodiments is at least two unless otherwise noted.

In some embodiments, the obtaining a to-be-processed image and a reference image includes: determining a target video on which noise reduction is to be performed; using a video frame in the target video as a to-be-processed image, and determining a target video frame from a forward video frame corresponding to the to-be-processed image; and obtaining a target noise reduction image corresponding to the target video frame, and determining the target noise reduction image corresponding to the target video frame as a reference image corresponding to the to-be-processed image.

The target video on which noise reduction is to be performed is a video on which noise reduction processing may be performed. The forward video frame corresponding to the to-be-processed image is a video frame whose time point is before that of the to-be-processed image in the target video. For example, if the to-be-processed image is a video frame at a $10^{th}$ second in the target video, a video frame before the $10^{th}$ second in the target video is the forward video frame of the to-be-processed image. The target noise reduction image corresponding to the target video frame is a target noise reduction image obtained when the target video frame is used as the to-be-processed image. In some embodiments, noise reduction may be performed through recursive filtering. A target noise reduction image of each frame of video frame obtained by using the image noise reduction method may be saved to be used as a reference image of a backward video frame of the video frame. It may be understood that, a backward video frame of a video frame is a video frame whose corresponding time point is after that of the video frame.

The computer device may sequentially determine various video frames after a first frame in the target video as to-be-processed images. For each to-be-processed image, the computer device may determine one or more target video frames from a forward video frame corresponding to the to-be-processed image, obtain a target noise reduction image corresponding to the target video frame, and use the target noise reduction image as a reference image corresponding to the to-be-processed image.

In some embodiments, a video application program may be installed on the computer device. The video application program may be used to shoot to obtain a video, or play and edit a video. The video application program may be, for example, a live streaming application program, a video editing application program, a video surveillance application program, a video conferencing application program, and the like. When the computer device performs video playback through the video application program, for various frames of video frames in a played video, the computer device may sequentially use the video frames as to-be-processed images, and obtain a reference image of the to-be-processed image, so that a target noise reduction image of the to-be-processed image can be obtained through the image noise reduction method, to improve visual quality of the video, and obtain better user experience. The application program herein may be a client installed on the terminal, and the client (which may also be referred to as an application client or an APP client) is a program installed and run on the terminal; the application program may also be an installation-free application program, that is, an application program that can be used without downloading and installing. Such application programs are also commonly referred to as applets, which are usually run on a client as subprograms; the application program may also be a web application program opened through a browser; and the like.

Figure 3:
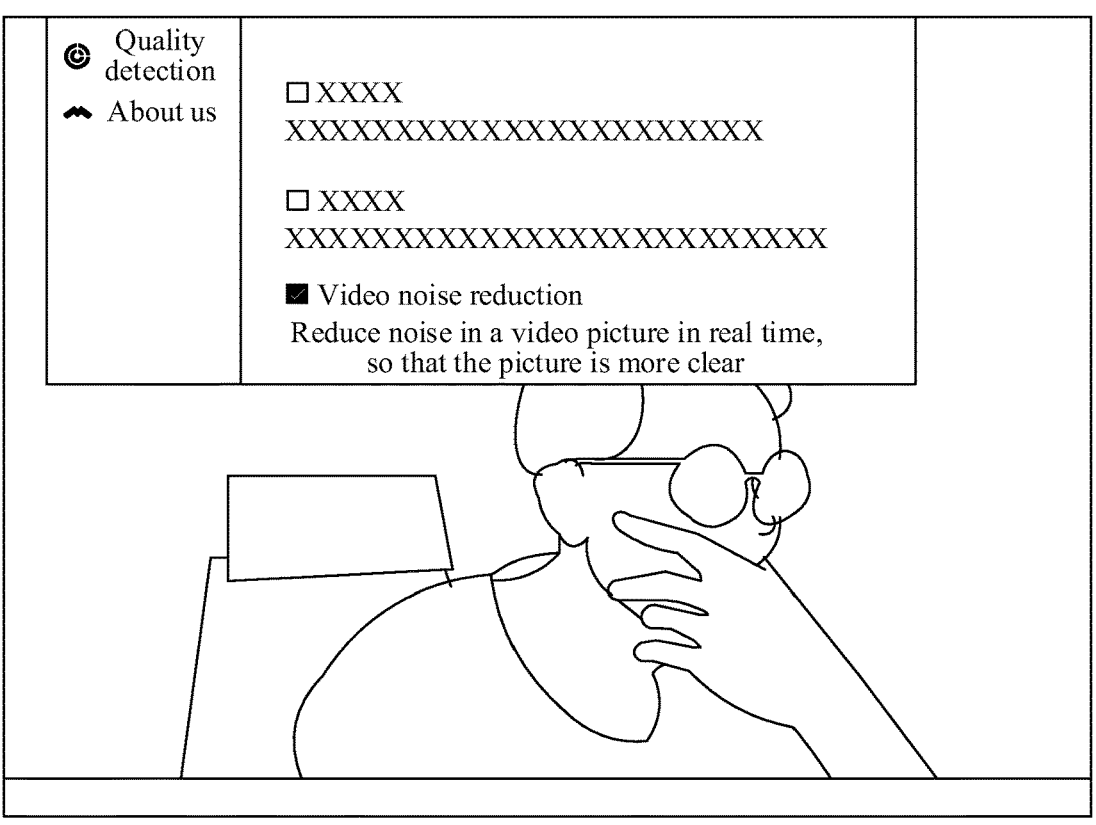
FIG. 3 is a schematic diagram of an interface in which an image noise reduction algorithm is applied to a video conferencing application program in some embodiments.

For example, FIG. 3 is a schematic diagram of an interface in which an image noise reduction algorithm in this application is applied to a video conferencing application program. Referring to FIG. 3, during a video conference, when a user checks a "video noise reduction" option in an interface of the video conferencing application program, the video conferencing application program may use the image noise reduction method to perform noise reduction processing on each video frame in a conference video generated in a conference scenario.

In some embodiments, considering that a correlation between video frames that are closely spaced in time is greater than a correlation between video frames that are far apart in time, using video frames that are closely spaced in time as target video frames to obtain a reference image can improve a noise reduction effect. In this case, when the computer device selects a target video frame, one or a preset quantity of video frames adjacent to a to-be-processed image in a forward video frame of the to-be-processed image may be used as the target video frame, and the preset quantity may be less than a preset threshold, the preset quantity may be, for example, 2. For example, assuming that the to-be-processed image is a fifth frame of video frame in the target video, a third frame of video frame and a fourth frame of video frame may be used as target video frames, and target noise reduction images of the third frame of video frame and the fourth frame of video frame are respectively obtained as a reference image of the fifth frame of video frame.

Operation 204: Determine motion intensity of a to-be-processed block in the to-be-processed image according to the reference image, the to-be-processed block being obtained by dividing the to-be-processed image.

The to-be-processed block is an image block obtained by dividing the to-be-processed image. A plurality of image blocks may be obtained by dividing the to-be-processed image, and each image block may be used as a to-be-processed block. The motion intensity may represent a motion amount of the to-be-processed block relative to the reference image. The motion intensity is negatively correlated with noise intensity of the to-be-processed block relative to the reference image, and is positively correlated with a difference degree of the to-be-processed block relative to the reference image.

Considering that noise information presents a Gaussian distribution in time domain, for example, noise appearing at a position in a current frame in a video may not exist at a same position in a forward frame or may have a weak intensity value, a weighting manner may be used for image fusion, for example, a current frame after fusion=0.2*previous two frames+0.3*previous frame+0.5*current frame. In this way, although noise can be reduced, fusion causes significant smear in a moving scenario. Therefore, in some embodiments, a motion-adaptive time domain filtering manner is used. When a large motion amount in the current frame is detected, a weight of the current frame is increased, and a proportion of the previous frame is weakened. For example, when there is a large motion amount, the current frame after fusion=0.05*previous two frames+0.05*previous frame+0.9*current frame, so that a smear problem can be alleviated. Further, considering that motion intensity of different areas in a video frame is often very different, for example, in a picture at a moment, only a character moves while a background is still, if motion intensity calculation is performed on an entire frame of image, weak time domain filtering intensity is selected, resulting in a poor noise reduction effect of a background area.

Based on this, in some embodiments, the to-be-processed image may be divided to obtain the plurality of image blocks, each image block is used as the to-be-processed block, and motion intensity of each to-be-processed block is estimated according to the reference image, to use different time domain filters in different image blocks according to estimated motion levels, so that there can still be a good noise reduction effect on the fixed background when the character moves.

Figure 4:
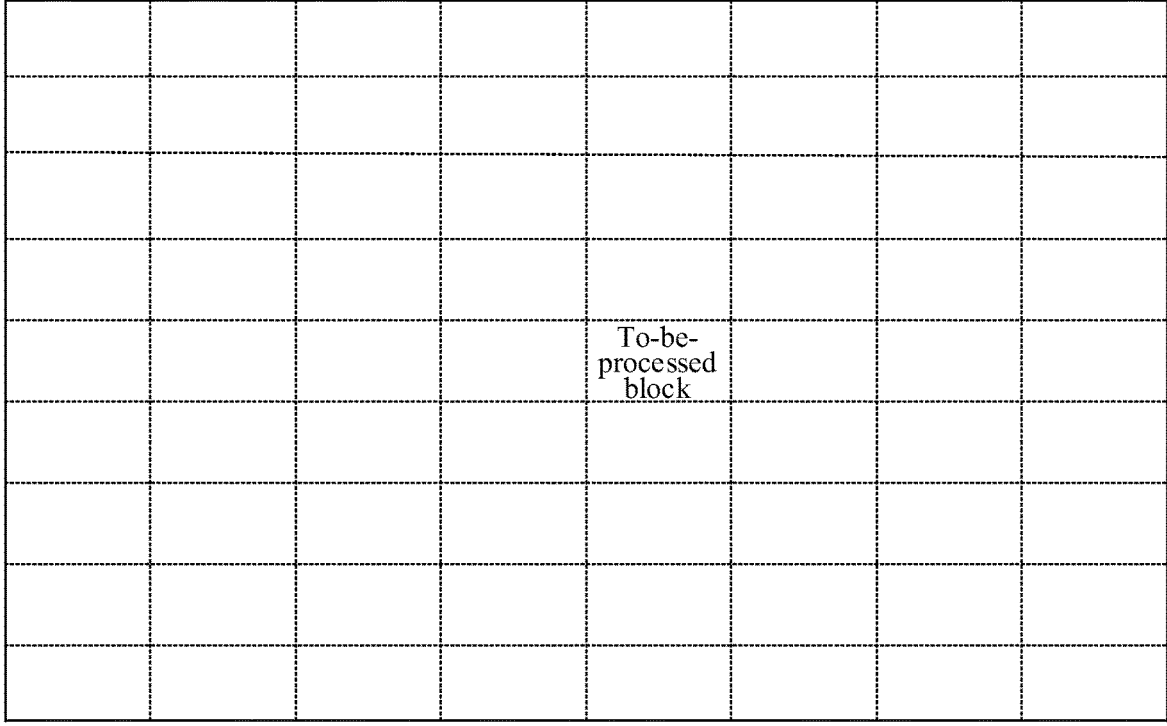
FIG. 4 is a schematic diagram of dividing a to-be-processed image in some embodiments.

In some embodiments, when the computer device divides the to-be-processed image, an even division manner may be used to evenly divide the to-be-processed image to obtain a plurality of to-be-processed blocks. If a height and a width of the to-be-processed image are H and W respectively, and the entire image is set to be divided into m rows and n columns, a height and a width of each block are H/m and W/n respectively. For example, FIG. 4 is a schematic diagram of dividing a to-be-processed image in some embodiments. Referring to FIG. 4, each small grid is one to-be-processed block. It may be understood that, in other embodiments, the computer device may also unevenly divide or divide the to-be-processed image in an overlapping manner but is not limited thereto.

In some embodiments, when there are a plurality of reference images, for each to-be-processed block in the to-be-processed image, the server may perform motion intensity calculation based on each reference image, so that a plurality of pieces of motion intensity can be obtained for each to-be-processed block.

Operation 206: Obtain filter coefficient description information matching the motion intensity, the filter coefficient description information being configured for describing a correspondence between a pixel difference and a filter coefficient representation value; and the filter coefficient representation value being negatively correlated with the pixel difference, and a degree of change of the filter coefficient representation value being positively correlated with the motion intensity.

The filter coefficient representation value is a value for representing a filter coefficient, and the filter coefficient representation value may be a filter coefficient value or a value obtained by performing calculation on the filter coefficient value.

In a noise reduction process in some embodiments, time domain filtering may be performed on the to-be-processed block according to the following formula, and i and j may be pixel position indexes in the to-be-processed image, Y indicates a pixel value in the to-be-processed block, $Y_{out}(t)$ indicates a time domain filtering result at a current moment, $Y_{out}(t-1)$ indicates a pixel value in the reference image, and the reference image herein may use a time domain filtering result at a moment t−1, and k indicates the filter coefficient:

$$Y_{out}(t)_{(i,j)} = Y_{out}(t-1)_{(i,j)} * k + Y_{(i,j)} * (1-k) \qquad (1)$$

The foregoing formula indicates that the time domain filtering result at the current moment is equal to weighted fusion of an input value at the current moment and a time domain filtering result at a previous moment. A filter coefficient k ranges from 0 to 1, and has the following relationship: A pixel difference (and the pixel difference herein may represent an absolute value of the difference between the two) between a current input $Y_{(i,j)}$ and the time domain filtering result $Y_{out}(t-1)_{(i,j)}$ at the previous moment is larger indicates k is smaller; otherwise, k is larger, so the filter coefficient k is negatively correlated with the difference between $Y_{out}(t-1)_{(i,j)}$ and $Y_{(i,j)}$. Based on this, in some embodiments, the correspondence between the pixel difference and the filter coefficient representation value may be established and saved as the filter coefficient description information, to determine the filter coefficient representation value based on the filter coefficient description information, and determine a time domain filtering result obtained by performing time domain filtering on the to-be-processed image through the filter coefficient representation value.

The motion-adaptive filtering manner, and different filtering effects may be obtained under different motion intensity: Larger motion intensity indicates that a filtering effect is to be weaker, and smaller motion intensity indicates that a filtering effect is to be appropriately enhanced. A plurality of pieces of filter coefficient description information may be predetermined, degree of changes of filter coefficient representation values in different pieces of filter coefficient description information are different, and the degree of change of the filter coefficient representation value is set to be positively correlated with the motion intensity. The degree of change of the filter coefficient representation value is a degree of change of the filter coefficient representation value as the pixel difference changes. Larger motion intensity indicates a larger degree of change of the filter coefficient representation value, and in this case, the filter coefficient representation value rapidly decreases as the pixel difference increases; otherwise, smaller motion intensity indicates a smaller degree of change of the filter coefficient representation value, and in this case, a decreasing degree of the filter coefficient representation value may become slower as the pixel difference increases.

Figure 5:
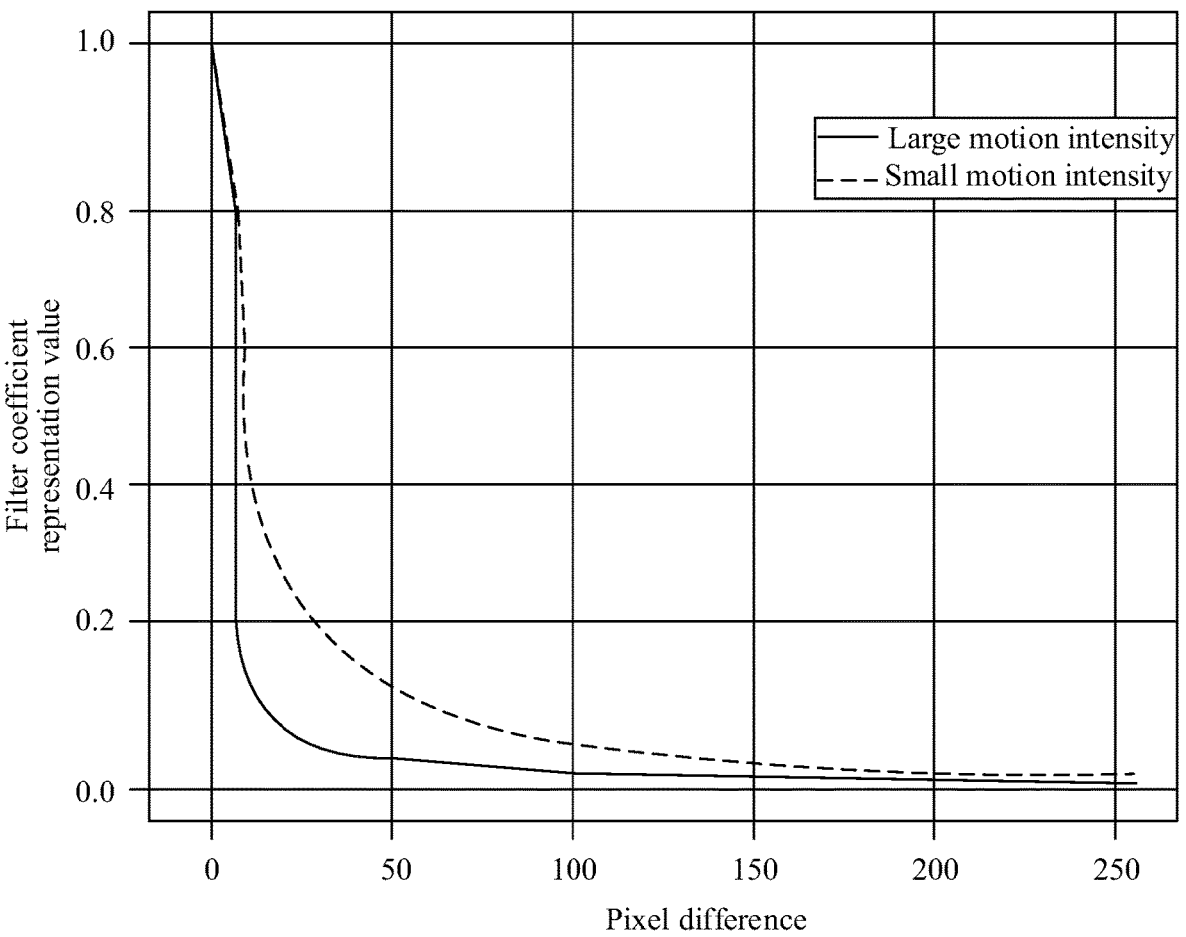
FIG. 5 is a schematic diagram of a filter function in some embodiments.

In some embodiments, the filter coefficient description information may be a filter function. In the filter function, the filter coefficient value is a dependent variable, and the pixel difference is an independent variable. For example, the filter function may be a decreasing exponential function of the filter coefficient about the pixel difference. The computer device may divide the motion intensity into a plurality of intervals, and set, in each interval, a corresponding filter function: Stronger motion indicates a steeper curve of the filter function. In this way, smear in a motion area can be avoided, and an image block with weak motion uses a relatively gentle filter curve, so that a better noise reduction effect can be achieved on a relatively fixed background. In some embodiments, the filter function may be an exponential function. For example, FIG. 5 is a schematic diagram of a filter function in some embodiments. In some embodiments shown in FIG. 5, the motion intensity is divided into two intervals, and a part less than a preset motion intensity threshold may be divided into a small motion intensity interval, and a part greater than the preset motion intensity threshold may be divided into a large motion intensity interval. For the small motion intensity interval, a designed filter function is shown as a dotted line in FIG. 5. For the large motion intensity interval, a designed filter function is shown as a solid line in FIG. 5. It can be seen from FIG. 5 that, a function curve corresponding to large motion intensity is steeper than a function curve corresponding to small motion intensity.

The computer device pre-saves the plurality of pieces of filter coefficient description information, and each piece of filter coefficient description information may correspond to one piece of reference motion intensity information. During filtering, the computer device may determine reference motion intensity information matching the motion intensity of the to-be-processed block from a plurality of pieces of reference motion intensity information, to obtain filter coefficient description information corresponding to the reference motion intensity information as the filter coefficient description information matching the motion intensity.

In some embodiments, when there are a plurality of reference images, a plurality of pieces of motion intensity may be obtained for each to-be-processed block. In this case, for each piece of motion intensity corresponding to each to-be-processed block, the computer device may obtain matched filter coefficient description information.

Operation 208: Obtain a target pixel difference between a pixel point in the to-be-processed block and a pixel point at a corresponding position in the reference image, to determine, based on the filter coefficient description information, a target filter coefficient representation value that has a correspondence with the target pixel difference.

For each pixel point in the to-be-processed block, the computer device may calculate a difference between the pixel point and a pixel point at a corresponding position in the reference image, and use an absolute value of the difference as a target pixel difference, to determine, based on the filter coefficient description information, a target filter coefficient representation value that has a correspondence with the target pixel difference.

In some embodiments, when there are a plurality of reference images, because each to-be-processed block corresponds to a plurality of pieces of filter coefficient description information, for the target pixel difference of each pixel point in the to-be-processed block, the computer device may determine, based on each piece of filter coefficient description information, a target filter coefficient representation value that has a correspondence with the target pixel difference, so that a plurality of target filter coefficient representation values can be obtained for each pixel point.

In some embodiments, when the filter coefficient description information is a filter function, the computer device may substitute a target pixel difference into the filter function, and a calculated function value is a target filter coefficient representation value corresponding to the target pixel difference.

Operation 210: Determine a target noise reduction image corresponding to the to-be-processed image based on the target filter coefficient representation value.

The computer device may determine, based on the target filter coefficient representation values corresponding to each pixel point, an intermediate processed image obtained by performing time domain filtering on the to-be-processed image, to obtain the target noise reduction image corresponding to the to-be-processed image based on the intermediate processed image.

In some embodiments, when a filter coefficient representation value is a filter coefficient value, the computer device may refer to the foregoing Formula (1); perform time domain filtering on each pixel point based on the target filter coefficient representation values corresponding to each pixel point in the to-be-processed block, to obtain a time domain filtering result of each pixel point; and update the to-be-processed image by using the time domain filtering result of each pixel point as a current pixel value in the to-be-processed image, to obtain the intermediate processed image.

In some embodiments, after the intermediate processed image is obtained, the computer device may directly use the intermediate processed image as the target noise reduction image corresponding to the to-be-processed image. In some embodiments, considering that there is still some large-amplitude noise hard to filter out after time domain filtering, the computer device can continue to use spatial filtering after a time domain operation, and use an image obtained through spatial filtering processing as the target noise reduction image. The spatial filtering herein is a smoothing method. A principle thereof is that pixel values of a natural image are relatively smooth and continuous in space, a shot image is a natural image with noise added, and a purpose of using spatial filtering is to eliminate unsmooth noise, to obtain a smooth natural image.

In some embodiments, the spatial filtering may use at least one of Gaussian filtering and bilateral filtering. In some embodiments, the computer device may obtain a trained deep learning model for spatial filtering, input the intermediate processed image into the deep learning model, and output the target noise reduction image through the deep learning model. The deep learning model for spatial filtering may be trained using a supervised training method. Input samples in a training process are original images without spatial filtering, and training labels are target images obtained through spatial filtering.

In the foregoing image noise reduction method, motion intensity of a to-be-processed block in a to-be-processed image is determined according to a reference image; filter coefficient description information matching the motion intensity is obtained; a target pixel difference between a pixel point in the to-be-processed block and a pixel point at a corresponding position in the reference image is obtained, to determine, based on the filter coefficient description information, a target filter coefficient representation value that has a correspondence with the target pixel difference; and a target noise reduction image corresponding to the to-be-processed image is determined based on the target filter coefficient representation value. Because the to-be-processed block is obtained by dividing the to-be-processed image, different target filter coefficient representation values may be determined for different to-be-processed blocks in the to-be-processed image, and the obtained target filter coefficient representation values may accurately match motion conditions of various areas in the image. In this way, a problem of a poor noise reduction effect in part areas caused when performing motion intensity estimation on the entire image is avoided, and a noise reduction effect of the to-be-processed image is improved. In addition, the target filter coefficient representation value is determined through the filter coefficient description information, the filter coefficient description information is configured for describing a correspondence between a pixel difference and a filter coefficient representation value, the filter coefficient representation value is negatively correlated with the pixel difference, and a degree of change of the filter coefficient representation value is positively correlated with the motion intensity. Therefore, for each pixel point, a target filter coefficient representation value matching the pixel point can be obtained, further improving the noise reduction effect of the to-be-processed image.

In some embodiments, the foregoing method further includes: determining a plurality of pieces of reference motion intensity information, and determining a pixel difference distribution range; determining, based on each piece of reference motion intensity information, filter coefficient representation values under a plurality of pixel differences in the pixel difference distribution range; establishing a correspondence between each filter coefficient representation value and a corresponding pixel difference; and forming filter coefficient description information by using correspondences of filter coefficient representation values determined based on a same piece of reference motion intensity information, to obtain filter coefficient description information corresponding to each piece of reference motion intensity information; and the obtaining filter coefficient description information matching the motion intensity includes: determining target motion intensity information matching the motion intensity from the plurality of pieces of reference motion intensity information, to determine filter coefficient description information corresponding to the target motion intensity information as the filter coefficient description information matching the motion intensity.

The reference motion intensity information is information used as a reference for determining the filter coefficient description information. The reference motion intensity information may be a motion intensity interval or a value. The pixel difference distribution range is a range in which all pixel differences are distributed, and the pixel difference distribution range may be [0, 255].

After the plurality of pieces of reference motion intensity information are determined and the pixel difference distribution range is determined, for each piece of reference motion intensity information, the computer device determines, on a premise of ensuring that the filter coefficient representation value is negatively correlated with the pixel difference and the degree of change of the filter coefficient representation value is positively correlated with the motion intensity, filter coefficient representation values under various pixel differences in the pixel difference distribution range. For example, assuming that pixel differences are integers, for each piece of reference motion intensity information, the computer device may determine filter coefficient representation values under a total of 256 pixel differences including 0, 1, 2, . . . in [0, 255].

Further, the computer device may establish the correspondence between each filter coefficient representation value and the corresponding pixel difference; form, from such correspondences, the filter coefficient description information by using the correspondences of the filter coefficient representation values determined based on the same piece of reference motion intensity information; and use the filter coefficient description information as the filter coefficient description information corresponding to the reference motion intensity information, to obtain the filter coefficient description information corresponding to each reference motion intensity information. In the foregoing example, it is assumed that there are two pieces of reference motion intensity information indicated as X1 and X2, a correspondence determined based on X1 is $(0, b1_0)$, $(1, b1_1)$, and $(255,$ $b1_{255})$, and a correspondence determined based on X2 is $(0, b2_0)$, $(1, b2_1)$, and $(255, b2_{255})$, and b may indicate a pixel difference. In this case, the computer device may form filter coefficient description information corresponding to X1 by using $(0, b1_0)$, $(1, b1_1)$, and $(255, b1_{255})$, and form filter coefficient description information corresponding to X2 by using $(0, b2_0)$, $(1, b2_1)$, and $(255, b2_{255})$.

In some embodiments, for each piece of filter coefficient description information, the computer device may store the correspondence in a form of the following table, and an index value of the table may be a pixel difference. Referring to Table 1, for example, when a target pixel difference is 3, a filter coefficient representation value is 0.88.

TABLE 1

| 1 | 0.96 | 0.92 | 0.88 | 0.84 | 0.80 | 0.23 | 0.20 | 0.18 | . . . |
|---|------|------|------|------|------|------|------|------|-------|

The computer device may further establish the correspondence between each piece of reference motion intensity information and the corresponding filter coefficient description information. Based on the correspondence, when the filter coefficient description information matching the motion intensity of the to-be-processed block may be obtained, the computer device may determine the target motion intensity information matching the motion intensity from the plurality of pieces of reference motion intensity information, to determine the filter coefficient description information that has a correspondence with the target motion intensity information as the filter coefficient description information matching the motion intensity.

In some embodiments, the reference motion intensity information may be reference motion intensity, and is a value. In this case, when determining target motion intensity information matching motion intensity, the computer device may determine, in the plurality of pieces of reference motion intensity, reference motion intensity with a smallest difference from the motion intensity as target reference motion intensity, to determine filter coefficient description information that has a correspondence with the target reference motion intensity as the filter coefficient description information matching the motion intensity. For example, assuming that reference motion intensity information includes 10, 20, and 30, if motion intensity of a to-be-processed block is 12, it may be determined that corresponding reference motion intensity information is 10, to determine filter coefficient description information corresponding to 10 as filter coefficient description information matching the motion intensity. It may be understood that, in some embodiments, the computer device may set a larger quantity of pieces of reference motion intensity, and establish a correspondence between each piece of filter coefficient description information and a plurality of pieces of reference motion intensity, so that the established correspondence is more accurate. For example, the computer device may set 10, 12, 14, 16, 18, 20, 22, 24, 26, 28, and 30; establish a correspondence between 10, 12, 14, and 16, and first filter coefficient description information; establish a correspondence between 18, 20, 22, 24, and 26, and second filter coefficient description information; and establish a correspondence between 28 and 30, and third filter coefficient description information.

In some embodiments, because filter coefficient description information describes a correspondence between a pixel difference and a filter coefficient representation value under each piece of reference motion intensity information, when time domain filtering is performed on a to-be-processed image, a pixel difference corresponding to a pixel point in the to-be-processed image may be directly used as an index, and a corresponding filter coefficient representation value may be queried from the filter coefficient description information. This avoids obtaining a filter coefficient through complex calculation, and improves filtering efficiency.

In some embodiments, the determining, based on each piece of reference motion intensity information, filter coefficient representation values under a plurality of pixel differences in the pixel difference distribution range includes: determining, based on each piece of reference motion intensity information, target filter coefficients under the plurality of pixel differences in the pixel difference distribution range; and multiplying each target filter coefficient by a corresponding pixel difference, to obtain a filter coefficient representation value under each pixel difference; and the determining a target noise reduction image corresponding to the to-be-processed image based on the target filter coefficient representation value includes: determining a time domain filtering result of the pixel point based on a size relationship between a pixel value of the pixel point and a pixel value of the pixel point at the corresponding position in the reference image, to determine the target noise reduction image corresponding to the to-be-processed image based on the time domain filtering result of the pixel point.

The foregoing Formula (1) may be further transformed as follows:

$$Y_{out}(t)_{(i,j)} = \left(Y_{out}(t-1)_{(i,j)} - Y_{(i,j)}\right) * k + Y_{(i,j)} \qquad (2)$$

$Y_{out}(t-1)_{(i,j)} - Y_{(i,j)}$ is the pixel difference, and k is the filter coefficient. It can be seen from Formula (2) that, if $Y_{out}(t-1)_{(i,j)} - Y_{(i,j)}) * k$ is calculated in advance, the filtering result at the current moment may be calculated through addition and subtraction calculations, so that the filtering efficiency can be further improved. Based on this, in some embodiments, the computer device may first determine, based on each piece of reference motion intensity information, the target filter coefficients under the plurality of pixel differences in the pixel difference distribution range; and ensure, when determining the target filter coefficients, that the filter coefficient representation value is negatively correlated with the pixel difference, and the degree of change of the filter coefficient representation value is positively correlated with the motion intensity.

After the target filter coefficients are determined, each target filter coefficient is multiplied by the corresponding pixel difference, to obtain the filter coefficient representation value under each pixel difference, that is, $(Y_{out}(t-1)_{(i,j)} - Y_{(i,j)}) * k$ is used as the filter coefficient representation value. For example, assuming that filter coefficients are stored in Table 1, a filter coefficient representation value obtained by multiplying each filter coefficient by a corresponding pixel difference is shown in Table 2 below. In Table 2, an index value is also a pixel difference. For example, assuming that a target pixel difference is 4, a filter coefficient representation value obtained by looking up the table may be as 3.36.

TABLE 2

| 0 | 0.96 | 1.84 | 2.64 | 3.36 | 4.0 | 1.38 | 1.40 | 1.44 | . . . |
|---|------|------|------|------|-----|------|------|------|-------|

It may be understood that, the pixel difference multiplied with the target filter coefficient herein is an absolute value of the pixel difference. Therefore, whether an actual calculation result of $(Y_{out}(t-1)_{(i,j)} - Y_{(i,j)}) * k$ is a positive value or a negative value may be determined based on the size relationship between the pixel value of the pixel point and the pixel value of the pixel point at the corresponding position in the reference image.

In some embodiments, the determining a time domain filtering result of the pixel point based on a size relationship between a pixel value of the pixel point and a pixel value of the pixel point at the corresponding position in the reference image includes: subtracting, when the pixel value of the pixel point is greater than or equal to the pixel value of the pixel point at the corresponding position in the reference image, the target filter coefficient representation value from the pixel value of the pixel point, to obtain the time domain filtering result of the pixel point; and adding, when the pixel value of the pixel point is less than or equal to the pixel value of the pixel point at the corresponding position in the reference image, the pixel value of the pixel point to the target filter coefficient representation value, to obtain the time domain filtering result of the pixel point.

When the pixel value of the pixel point is greater than the pixel value of the pixel point at the corresponding position in the reference image, $(Y_{out}(t-1)_{(i,j)} - Y_{(i,j)}) * k$ is a negative value, and it can be seen from Formula (2) that, the filtering result in this case is equivalent to subtracting the target filter coefficient representation value from the pixel value of the pixel point. When the pixel value of the pixel point is less than the pixel value of the pixel point at the corresponding position in the reference image, $(Y_{out}(t-1)_{(i,j)} - Y_{(i,j)}) * k$ is a positive value, and the filtering result in this case is equivalent to adding the pixel value of the pixel point to the target filter coefficient representation value. When the pixel value of the pixel point is equal to the pixel value of the pixel point at the corresponding position in the reference image, that is, $Y_{out}(t-1)_{(i,j)} = Y_{(i,j)}), Y_{out}(t-1)_{(i,j)} - Y_{(i,j)}) * k$ is 0 in this case; the computer device subtracts the target filter coefficient representation value from the pixel value of the pixel point to obtain the time domain filtering result of the pixel point, or adds the pixel value of the pixel point to the target filter coefficient representation value to obtain the time domain filtering result of the pixel point; and it can be seen that, the time domain filtering result in this case is $Y_{out}(t-1)_{(i,j)}$ or $Y_{(i,j)}$.

For example, as shown in Table 2, assuming that the target pixel difference is 3 and the target filter coefficient representation value obtained by looking up the table is 2.64, when $Y_{out}(t-1)_{(i,j)} < Y_{(i,j)}$, the time domain filtering result is that $Y_{out}(t)_{(i,j)} = Y_{(i,j)} - 3.36$; and when $Y_{out}(t-1)_{(i,j)} > Y_{(i,j)}$, the time domain filtering result is that $(Y_{out}(t)_{(i,j)} = Y_{(i,j)} + 3.36$.

Further, after the time domain filtering result of each pixel point in the to-be-processed image is obtained, the computer device updates a pixel value in the to-be-processed image by using the time domain filtering result, to obtain an intermediate processed image. The computer device may determine the target noise reduction image corresponding to the to-be-processed image based on the intermediate processed image. For details, refer to description of some embodiments.

In some embodiments, by multiplying each target filter coefficient by a corresponding pixel difference to obtain a filter coefficient representation value under each pixel difference, a complex function operation can be converted into addition and subtraction calculations, further improving filtering efficiency in a time domain filtering process, so that noise reduction efficiency can be improved.

In some embodiments, the determining a plurality of pieces of reference motion intensity information includes: dividing a motion intensity distribution range into a plurality of motion intensity intervals, and using each motion intensity interval as one piece of reference motion intensity information; and the determining target motion intensity information matching the motion intensity from the plurality of pieces of reference motion intensity information, to determine filter coefficient description information corresponding to the target motion intensity information as the filter coefficient description information matching the motion intensity includes: determining a target interval to which the motion intensity belongs from the plurality of motion intensity intervals, and determining filter coefficient description information corresponding to the target interval as the filter coefficient description information matching the motion intensity.

The motion intensity distribution range is a range in which all pieces of motion intensity are distributed.

In this embodiment, the computer device may divide the motion intensity distribution range into a plurality of intervals to obtain the plurality of motion intensity intervals, use each motion intensity interval as one piece of reference motion intensity information, and establish a correspondence between the motion intensity interval and filter coefficient description information. In this way, after determining the motion intensity of the to-be-processed block, the computer device may determine which motion intensity interval the motion intensity belongs to, determine the motion intensity interval to which the motion intensity belongs as the target interval, obtain the filter coefficient description information that has a correspondence with the target interval, and determine the filter coefficient description information as the filter coefficient description information matching the motion intensity.

For example, it is assumed that the motion intensity distribution range is [a, b], and the motion intensity distribution range may be divided into three intervals, namely, [a, c], (c, d), and [d, b], wherein a<c<d<b. If motion intensity of the to-be-processed block belongs to (c, d), (c, d) may be determined as the target interval, and the corresponding filter coefficient description information may be determined as the filter coefficient description information matching the motion intensity.

In some embodiments, a motion intensity distribution range is divided into a plurality of intervals, and each motion intensity interval is used as one piece of reference motion intensity information, so that matched filter coefficient description information can be determined through a motion intensity interval to which the motion intensity belongs, thereby improving accuracy of the determined filter coefficient description information.

In some embodiments, before the determining motion intensity of a to-be-processed block in the to-be-processed image according to the reference image, the image noise reduction method further includes: converting three primary color channel data in the to-be-processed image into luma channel data, chroma channel data, and concentration channel data, and extracting the luma channel data; and converting three primary color channel data in the reference image into luma channel data, chroma channel data, and concentration channel data, and extracting the luma channel data; the determining motion intensity of a to-be-processed block in the to-be-processed image according to the reference image includes: determining the motion intensity of the to-be-processed block according to the luma channel data of the reference image and luma channel data of the to-be-processed block; the obtaining a target pixel difference between a pixel point in the to-be-processed block and a pixel point at a corresponding position in the reference image includes: obtaining a pixel difference between the pixel point in the to-be-processed block and the pixel point at the corresponding position in the reference image under the luma channel data, to obtain the target pixel difference; and the determining a target noise reduction image corresponding to the to-be-processed image based on the target filter coefficient representation value includes: determining, based on the target filter coefficient representation value, the target noise reduction image obtained by performing noise reduction processing on the luma channel data of the to-be-processed image.

Three primary color channels are three channels of red (R), green (G), and blue (B). A display technology achieves almost any color of visible light by combining the three primary colors of red, green, and blue with different intensity. In image storage, a manner of recording an image by recording red, green, and blue intensity of each pixel is an RGB model. In common image file formats, PNG and BMP are based on the RGB model. In addition to the RGB model, there is also a widely used model referred to as a YUV model, which is also referred to as a luma-chroma model. The YUV model is a model that records an image by converting RGB three channels into one channel (Y, also referred to as Luma) indicating luma and two channels (UV, also referred to as Chroma) indicating chroma through mathematical conversion.

In some embodiments, it is known that formulas for converting RGB three channel data into YUV three channel data are as follows:

$$Y = 0.299 * R + 0.587 * G + 0.114 * B \qquad (3)$$

$$U = -0.169 * R - 0.331 * G + 0.5 * B \qquad (4)$$

$$V = 0.5 * R - 0.419 * G - 0.081 * B \qquad (5)$$

Y indicates a luma channel value, U indicates a chroma channel value, V indicates a concentration channel value, R indicates an R-channel value, G indicates a G-channel value, and B indicates a B-channel value.

Considering that the foregoing Formula (3) to Formula (5) are floating-point operations, and a floating-point multiplication operation uses exponent and mantissa operations inside a computer, which is relatively time-consuming, in some embodiments, the floating point operations are transformed into integer operations through some mathematical transformations. By using a Y channel as an example, a transformation process is as follows:

$$Y = 0.299 * R + 0.587 * G + 0.114 * B =$$
$$128 * (0.299 * R + 0.587 * G + 0.114 * B) >>$$
$$7 = (38 * R + 75 * B + 15 * B) >>$$

A U channel and a V channel may be transformed in a same manner by referring to the Y channel. Amplified values are rounded. After such transformations, the floating-point operations become integer multiplication and displacement operations, the displacement operation is very efficient, and the integer multiplication operation is also more efficient than the floating-point operations, so that obtained Y-channel data, U-channel data, and V-channel data are all integer values.

In this embodiment, based on a characteristic that human eyes are more sensitive to a luma channel component in an image, the computer device may convert the three primary color channel data in the to-be-processed image into Y-channel data, U-channel data, and V-channel data, extract only the Y-channel data, and perform noise reduction processing on the Y-channel data; and similarly convert the three primary color channel data in the reference image into Y-channel data, U-channel data, and V-channel data, and extract only the Y-channel data. In this way, the computer device may determine motion intensity of the luma channel data of the to-be-processed block according to the luma channel data of the reference image; obtain the pixel difference between the pixel point in the to-be-processed block and the pixel point at the corresponding position in the reference image under the luma channel data, to obtain the target pixel difference; and finally determine, based on the target filter coefficient representation value, the target noise reduction image obtained by performing noise reduction processing on the luma channel data of the to-be-processed image.

In some embodiments, a to-be-processed image is converted from an RGB domain to a YUV domain, and then noise reduction processing is performed on only a luma channel Y, so that an amount of calculation in a noise reduction process is reduced, and image noise reduction efficiency is improved.

In some embodiments, the determining, based on the target filter coefficient representation value, the target noise reduction image obtained by performing noise reduction processing on the luma channel data of the to-be-processed image includes: determining, based on the target filter coefficient representation value, intermediate processed data obtained by performing time domain filtering on the luma channel data of the to-be-processed image; performing spatial noise reduction based on the intermediate processed data, to obtain target luma data corresponding to the to-be-processed image; and combining and converting the target luma data, and the chroma channel data and the concentration channel data of the to-be-processed image into three primary color channel data, to obtain the target noise reduction image.

In this embodiment, because the luma channel data of the to-be-processed image is extracted, after the target filter coefficient representation value of each pixel point is determined, the computer device may determine the intermediate processed data obtained by performing time domain filtering on the luma channel data of the to-be-processed image; may further perform spatial noise reduction based on the intermediate processed data, to obtain the target luma data under a luma channel; and may finally combine and convert the target luma data, and the chroma channel data and the concentration channel data separated from the to-be-processed image into the three primary color channel data, to obtain the target noise reduction image.

In some embodiments, after time domain and spatial noise reduction processing is performed on Y-channel data, the Y-channel data, U-channel data, and V-channel data are further combined and converted into RGB data, so that an obtained target noise reduction image may be achieved.

In some embodiments, the image noise reduction method further includes: determining a luma representation value of the to-be-processed block based on the luma channel data of the to-be-processed block; entering, when the luma representation value is less than or equal to a preset luma threshold, the operation of determining the motion intensity of the to-be-processed block according to the luma channel data of the reference image and luma channel data of the to-be-processed block; and using, when the luma representation value is greater than the preset luma threshold, the luma channel data of the to-be-processed block as the intermediate processed data, and entering the operation of performing spatial noise reduction based on the intermediate processed data, to obtain target luma data corresponding to the to-be-processed image.

The luma representation value is configured for representing entire luma of the to-be-processed block. The luma representation value may be obtained by collecting statistics on Y-channel values of pixel points in the to-be-processed block, and the statistics collection herein may be one of summing, averaging, or finding a median. In some embodiments, assuming that a current block is Y and a height and a width thereof are h and w, a luma representation value may be calculated by using the following Formula (6):

$$\text{mean\_l} = (h * w)/\sum_{i=1}^{h}\sum_{j=1}^{w} Y_{i,j} \tag{6}$$

According to visual characteristics, when image luma is high, a signal-to-noise ratio is very high. In this case, human eyes cannot observe a noise signal. Therefore, noise reduction on areas with high luma values brings unnecessary waste of performance. In this embodiment, a luma representation value of a to-be-processed block is obtained through statistics collection, and no time domain noise reduction processing is performed on a to-be-processed block whose luma representation value is greater than a threshold, to achieve a purpose of saving performance.

Figure 6:
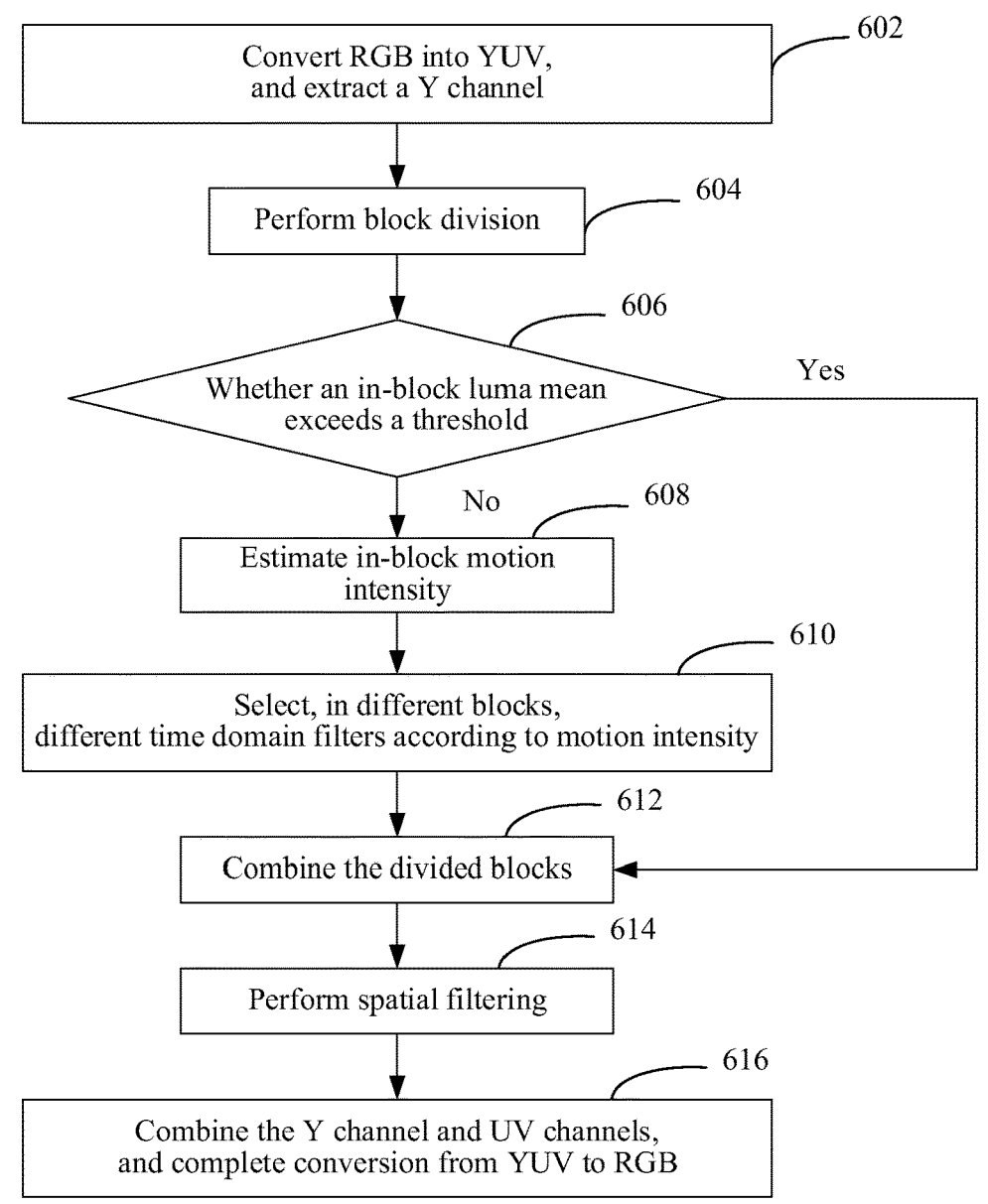
FIG. 6 is a schematic flowchart of an image noise reduction method in some embodiments.

In some embodiments, FIG. 6 is a schematic flowchart of an image noise reduction method. The method includes the following operations.

Operation 602: Convert RGB into YUV and extract a Y channel.

A computer device may convert a to-be-processed image from an RGB format to a YUV format, and extract Y-channel data therein; and convert a reference image from an RGB format to a YUV format, and extract Y-channel data therein.

Operation 604: Perform block division.

The computer device may divide the to-be-processed image, to obtain a plurality of to-be-processed blocks.

Operation 606: Determine whether a luma mean in a block exceeds a threshold; enter operation 612 if the luma mean in the block exceeds the threshold; and perform operation 608 if the luma mean in the block does not exceed the threshold.

The computer device calculates a luma mean of each to-be-processed block. For each to-be-processed block, if the luma mean is greater than the luma threshold, operation 612 is entered; and if the luma mean is less than or equal to the luma threshold, operation 608 is entered.

Operation 608: Estimate in-block motion intensity.

For a to-be-processed block whose luma mean is less than or equal to the luma threshold, the computer device may determine motion intensity of the to-be-processed block based on the Y-channel data of the reference image.

Operation 610: Select, in different blocks, different time domain filters according to motion intensity.

After the motion intensity of the to-be-processed block is determined, the computer device may obtain filter coefficient description information matching the motion intensity. In this way, for each pixel point in the to-be-processed block whose luma mean is less than or equal to the luma threshold, the computer device may obtain a target pixel difference between the pixel point and a pixel point at a corresponding position in the reference image, and determine, based on the filter coefficient description information, a target filter coefficient representation value that has a correspondence with the target pixel difference, so that a target filter coefficient representation value of each pixel point can be obtained. The computer device may determine, based on each target filter coefficient representation value, a time domain filtering result obtained by performing time domain filtering on Y-channel data of each pixel point in the to-be-processed block. Time domain filtering results of the pixel points form intermediate processed data of the to-be-processed block.

Operation 612: Combine the divided blocks.

Operation 614: Perform spatial filtering.

The computer device may combine intermediate processed data of the to-be-processed blocks, including intermediate processed data of a to-be-processed block whose luma mean is greater than the preset luma threshold, and intermediate processed data of a to-be-processed block whose luma mean is less than or equal to the preset luma threshold; and perform spatial noise reduction on intermediate processed data obtained through combination, to obtain target luma data corresponding to the to-be-processed image. Because no time domain noise reduction processing is performed on the to-be-processed block whose luma mean is greater than the preset luma threshold, the intermediate processed data is original luma channel data of the to-be-processed block.

Operation 616: Combine the Y channel and UV channels, and complete conversion from YUV to RGB.

The computer device combines and converts the target luma data, U-channel data, and V-channel data into an RGB format, to finally obtain the target noise reduction image.

In some embodiments, when data in an RGB format is converted into data in a YUV format, time domain noise reduction processing is performed on only Y-channel data, and no time domain noise reduction is performed on a to-be-processed block whose luma mean is greater than a preset luma threshold, so that performance of a computer device is saved while a noise reduction effect is met, thereby avoiding waste of performance.

In some embodiments, the determining motion intensity of a to-be-processed block in the to-be-processed image according to the reference image includes: determining a difference degree of the to-be-processed block relative to the reference image, and noise intensity of the to-be-processed block relative to the reference image; and determining the motion intensity of the to-be-processed block based on the difference degree and the noise intensity, the motion intensity being positively correlated with the difference degree, and the motion intensity being negatively correlated with the noise intensity.

The difference degree is configured for representing a difference size of the to-be-processed block relative to the reference image. A larger difference indicates a larger difference degree. The noise intensity is configured for representing a noise level of the to-be-processed block relative to the reference image. Greater noise indicates larger noise intensity. In some embodiments, the difference degree may be obtained by collecting statistics on pixel differences of moving pixel points in the to-be-processed block relative to the reference image. The statistics collection may be summing, averaging, or finding a median. The noise intensity may be obtained by collecting statistics on pixel differences of noise pixel points in the to-be-processed block relative to the reference image according to a statistics collection manner the same as that of the difference degree. The moving pixel points and the noise pixel points in the to-be-processed block may be distinguished through change ranges relative to the reference image. For example, a pixel point with a pixel difference greater than a preset threshold may be determined as a moving pixel point, and a pixel point with a pixel difference less than or equal to the preset threshold may be determined as a noise pixel point.

For the to-be-processed block in the to-be-processed image, the computer device may determine a difference degree of the to-be-processed block relative to an image block at a corresponding position in the reference image, and noise intensity of the to-be-processed block relative to the image block at the corresponding position in the reference image; and determine the motion intensity of the to-be-processed block based on the difference degree and the noise intensity. The motion intensity is positively correlated with the difference degree, and the motion intensity is negatively correlated with the noise intensity.

The positive correlation means that when other conditions remain unchanged, two variables change in a same direction; and when one variable changes from large to small, the other variable also changes from large to small. It may be understood that, the positive correlation herein means that change directions are consistent, but it does not require that when one variable changes a little, the other variable also necessarily changes. For example, it may be set that, when a variable a ranges from 10 to 20, a variable b is 100; and when the variable a ranges from 20 to 30, the variable b is 120. In this way, change directions of a and b are that when a becomes larger, b also becomes larger. However, when a is in the range of 10 to 20, b may not change. The negative correlation means that when one variable changes from large to small, the other variable also changes from small to large, that is, change directions of the two variables are opposite.

It can be seen that, in some embodiments, a larger difference degree indicates larger motion intensity, and a smaller difference degree indicates smaller motion intensity; and larger noise intensity indicates smaller motion intensity, and smaller noise intensity indicates larger motion intensity.

In some embodiments, the computer device may obtain the motion intensity by calculating a ratio of the difference degree to the noise intensity, that is, motion intensity=difference degree/noise intensity.

In some embodiments, motion intensity of a to-be-processed block may be determined based on a difference degree and noise intensity, the motion intensity is positively correlated with the difference degree, and the motion intensity is negatively correlated with the noise intensity, so that the motion intensity can accurately reflect a noise situation of a to-be-processed image, thereby improving accuracy of image noise reduction.

In some embodiments, the determining a difference degree of the to-be-processed block relative to the reference image, and noise intensity of the to-be-processed block relative to the reference image includes: obtaining a pixel difference of each pixel point in the to-be-processed block relative to a pixel point at a corresponding position in the reference image; determining a noise pixel point and a moving pixel point in the to-be-processed block based on the pixel difference corresponding to each pixel point, the moving pixel point being a pixel point with a pixel difference greater than a preset difference threshold, and the noise pixel point being a pixel point with a pixel difference less than or equal to the preset difference threshold; and collecting statistics on a pixel difference of each noise pixel point to obtain the noise intensity, and collecting statistics on a pixel difference of each moving pixel point to obtain the difference degree.

For a pixel point in the to-be-processed image, a pixel point that has a position correspondence with the pixel point in the reference image is a pixel point with same pixel coordinates as the pixel point. For example, assuming that pixel coordinates of a pixel point in the to-be-processed image are (x1, y1), pixel coordinates of a pixel point that has a position correspondence with the pixel point in the reference image are also (x1, y1) in the reference image.

Considering that a motion range of noise may be relatively small, in some embodiments, a difference threshold N may be preset. For each pixel point in the to-be-processed block, when the pixel difference of the pixel point relative to the pixel point at the corresponding position in the reference image is less than or equal to the preset difference threshold, it indicates that the pixel point at the position has no large pixel value difference in previous and next frames, and is likely to be a noise signal; and in this case, the computer device may determine the pixel point as a noise pixel point. Otherwise, when the pixel difference of the pixel point relative to the pixel point at the corresponding position in the reference image is greater than the preset difference threshold, it indicates that the pixel point at the position may move, and in this case, the computer device may determine the pixel point as a moving pixel point.

The computer device may collect statistics on the pixel difference of each noise pixel point in the to-be-processed block to obtain the noise intensity. For example, the computer device may add the pixel difference of each noise pixel point to obtain the noise intensity. The computer device may collect statistics on the pixel difference of each moving pixel point in the to-be-processed block to obtain the difference degree. For example, the computer device may add the pixel difference of each moving pixel point to obtain the difference degree.

In this embodiment, for each pixel point in the to-be-processed block, when the computer device obtains the pixel difference of the pixel point relative to the pixel point at the corresponding position in the reference image, the pixel difference is an absolute difference. Assuming that a pixel value of a pixel point in the to-be-processed block is X, and a pixel value of a pixel point that has a position correspondence with the pixel point in the reference image is Y, a pixel difference is $|X-Y|$.

In some embodiments, a noise pixel point and a moving pixel point are determined based on a size relationship between a pixel difference and a preset difference threshold, so that noise intensity may be obtained by collecting statistics on a pixel difference of each noise pixel point, and a difference degree may be obtained by collecting statistics on a pixel difference of each moving pixel point. Because a pixel difference can reflect whether a pixel point at each position moves, accuracy of motion intensity calculation is improved.

In some embodiments, the determining a target noise reduction image corresponding to the to-be-processed image based on the target filter coefficient representation value includes: determining, based on the target filter coefficient representation value, an intermediate processed image obtained by performing time domain filtering on the to-be-processed image, to use the intermediate processed image as an input image and a guide image respectively; down-sampling the input image to obtain a first sampled image, and down-sampling the guide image to obtain a second sampled image; performing guided filtering on the first sampled image based on the second sampled image, to obtain a target image; and up-sampling the target image according to a size of the input image, to obtain the target noise reduction image with a same size as the input image.

In this embodiment, after the intermediate processed image is obtained, the computer device uses the intermediate processed image as the input image and the guide image respectively; further down-samples the input image, so that the input image is reduced according to a target scaling ratio, to obtain the first sampled image, and down-samples the guide image, so that the guide image is reduced according to the target scaling ratio, to obtain the second sampled image; and then performs guided filtering on the first sampled image based on the second sampled image, to obtain the target image, and the target image may be still an image with a size reduced. Therefore, the computer device further up-samples the target image according to the size of the input image, so that the target image is enlarged according to the target scaling ratio, to obtain the target noise reduction image with the same size as the input image.

In some embodiments, when performing guided filtering, because an input image and a guide image are a same image, details can be retained at edges of the image, and smoothing is performed in flat areas, thereby mitigating an image blur problem caused by noise reduction. In addition, because the input image and the guide image are down-sampled in the filtering process, computational complexity in the filtering process can be reduced, and costs of noise reduction are reduced.

Figure 7:
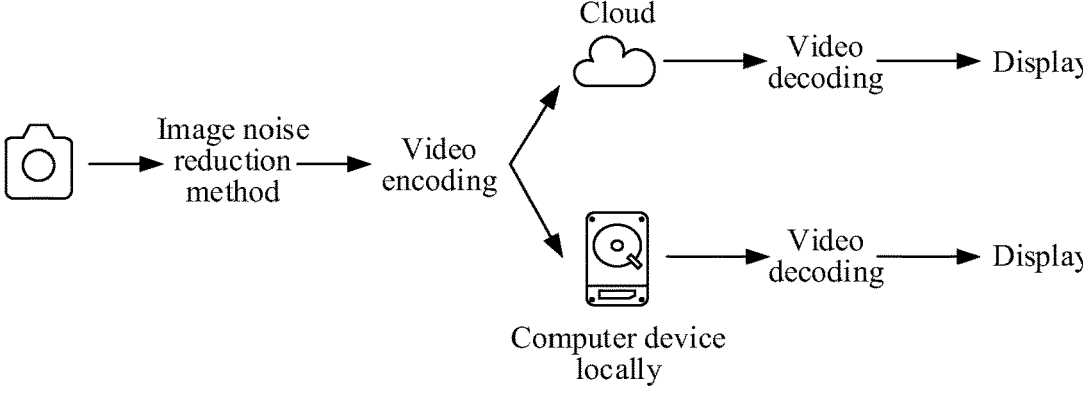
FIG. 7 is a diagram of an application architecture of an image noise reduction method in some embodiments.

In some embodiments, the image noise reduction method may be applied in an architecture shown in FIG. 7. Images in an image sequence acquired by a camera are sequentially used as to-be-processed images. After the target noise reduction image is obtained through the image noise reduction method, video encoding is performed to obtain encoded data, and the encoded data is sent to a cloud. After the cloud decodes the video data, a decoded video stream is presented to a user. In addition, the computer device may also decode the encoded data locally, and present the decoded video stream to the user. The camera may be from a built-in camera of the computer device or from an external camera. An original image acquired by the camera includes a noise signal. Through image noise reduction processing, a clean image can be produced, thereby improving image quality. In addition, because noise is filtered out, and there is no need to encode irregular noise signals in a subsequent video encoding process, a smaller encoded file can be produced, reducing a bandwidth and storage space.

In some embodiments, as shown in FIG. 8, a filter data processing method is performed by a computer device. The computer device may be the terminal 102 in FIG. 1, or may be the server 104 in FIG. 1, or may be a system formed by the terminal 102 and the server 104. The filter data processing method includes the following operations.

Operation 802: Obtain a plurality of pieces of reference motion intensity information, and determine a pixel difference distribution range.

Operation 804: Determine, based on each piece of reference motion intensity information, filter coefficient representation values under a plurality of pixel differences in the pixel difference distribution range.

The reference motion intensity information is information used as a reference for determining filter coefficient description information. The reference motion intensity information may be a motion intensity interval or a value. The pixel difference distribution range is a range in which pixel differences are distributed, and the pixel difference distribution range may be [0, 255].

After the plurality of pieces of reference motion intensity information are obtained and the pixel difference distribution range is determined, for each piece of reference motion intensity information, the computer device determines, on a premise of ensuring that the filter coefficient representation value is negatively correlated with the pixel difference and a degree of change of the filter coefficient representation value is positively correlated with motion intensity, filter coefficient representation values under various pixel differences in the pixel difference distribution range.

Operation 806: Establish a correspondence between each filter coefficient representation value and a corresponding pixel difference.

Operation 808: Form filter coefficient description information by using correspondences of filter coefficient representation values determined based on a same piece of reference motion intensity information, to obtain filter coefficient description information corresponding to each piece of reference motion intensity information.

The filter coefficient description information is configured for performing time domain filtering on a to-be-processed image.

The computer device may establish the correspondence between each filter coefficient representation value and the corresponding pixel difference; form, from such correspondences, the filter coefficient description information by using the correspondences of the filter coefficient representation values determined based on the same piece of reference motion intensity information; and use the filter coefficient description information as the filter coefficient description information corresponding to the reference motion intensity information, to obtain the filter coefficient description information corresponding to each reference motion intensity information.

In some embodiments, the computer device may further establish the correspondence between each piece of reference motion intensity information and the corresponding filter coefficient description information. Based on the correspondence, when time domain filtering may be performed on the to-be-processed image, and filter coefficient description information matching motion intensity of a to-be-processed block in the to-be-processed image may be obtained, the computer device may determine target motion intensity information matching the motion intensity from the plurality of pieces of reference motion intensity information, to determine filter coefficient description information that has a correspondence with the target motion intensity information as the filter coefficient description information matching the motion intensity, so that time domain filtering may be determined to be performed on the to-be-processed image based on the filter coefficient description information.

In the foregoing filter data processing method, because filter coefficient description information describes a correspondence between a pixel difference and a filter coefficient representation value under each piece of reference motion intensity information, when time domain filtering is performed on a to-be-processed image, a pixel difference corresponding to a pixel point in the to-be-processed image may be directly used as an index, and a corresponding filter coefficient representation value may be queried from the filter coefficient description information. This avoids obtaining a filter coefficient through complex calculation, and improves filtering efficiency.

In some embodiments, the determining, based on each piece of reference motion intensity information, filter coefficient representation values under a plurality of pixel differences in the pixel difference distribution range includes:

determining, based on each piece of reference motion intensity information, target filter coefficients under the plurality of pixel differences in the pixel difference distribution range; and multiplying each target filter coefficient by a corresponding pixel difference, to obtain a filter coefficient representation value under each pixel difference.

In some embodiments, the foregoing filter data processing method further includes: obtaining the to-be-processed image and a reference image; determining motion intensity of a to-be-processed block in the to-be-processed image according to the reference image, the to-be-processed block being obtained by dividing the to-be-processed image; obtaining filter coefficient description information matching the motion intensity, the filter coefficient description information being configured for describing a correspondence between a pixel difference and a filter coefficient representation value; and the filter coefficient representation value being negatively correlated with the pixel difference, and a degree of change of the filter coefficient representation value being positively correlated with the motion intensity; obtaining a target pixel difference between a pixel point in the to-be-processed block and a pixel point at a corresponding position in the reference image, to determine, based on the filter coefficient description information, a target filter coefficient representation value that has a correspondence with the target pixel difference; and determining a target noise reduction image corresponding to the to-be-processed image based on the target filter coefficient representation value.

Although operations in the flowcharts involved in some embodiments are displayed sequentially according to instructions of arrows, these operations are not necessarily performed sequentially according to a sequence instructed by the arrows. Unless otherwise specified, execution of the operations is not strictly limited, and the operations may be performed in other sequences. In addition, at least some operations in the flowcharts involved in some embodiments may include a plurality of operations or a plurality of stages, and these operations or stages are not necessarily performed at a same moment, but may be performed at different moments. The operations or stages are not necessarily performed in sequence, but may be performed by turn or with other operations or at least part of operations or stages in other operations.

In some embodiments, in an application scenario, the image noise reduction is applied to a video conferencing application program, to perform noise reduction processing on a video frame in a video conference. The computer device may sequentially use, starting from a second frame, video frames in a video frame sequence obtained through shooting during the conference as to-be-processed images. For each to-be-processed imaged, the following operations are performed.

1. Convert the to-be-processed image from an RGB format to a YUV format.

2. Evenly divide the to-be-processed image, to obtain a plurality of to-be-processed blocks.

Assuming that a height and a width of the to-be-processed image are H and W respectively, and the to-be-processed image may be divided into m rows and n columns, a height and a width of each block are H/m and W/n respectively.

3. Use each to-be-processed block in the to-be-processed image as a current to-be-processed block; and for a current to-be-processed block Y, collect statistics on a luma mean in the to-be-processed block Y, and determine whether the luma mean exceeds a preset luma threshold. When the luma mean exceeds the preset luma threshold, it indicates that luma of the to-be-processed block is very high and human eyes cannot observe noise, and in this case, the to-be-processed block does not need to be processed and operation 9 is directly entered. Otherwise, subsequent time domain noise reduction may be used, and operation 4 is entered.

4. Estimate in-block motion intensity. First, for each to-be-processed block, a frame difference D between a current moment (current frame) t and a previous moment (previous frame) t−1 is calculated, which may be formulated as $D(t)=|Y(t)-Y(t-1)|$. Considering that amplitude of noise is generally relatively small, a noise threshold N is artificially set, and (i, j) is set as a position index. When $D(t)_{i,j} \leq N$, it indicates that a pixel point at the coordinates (i, j) has no large pixel value difference in previous and next frames, and is likely to be a noise pixel point. Otherwise, when $D(t)_{i,j} > N$, it indicates that the pixel point at the position is likely to move. Matrices VN and VS are defined. VN is configured for indicating a change range of a noise pixel point, and VS is configured for indicating a change range of a moving pixel point. Matrix sizes of VN and VS are consistent with that of the current to-be-processed block Y. When $D(t)_{i,j} \leq N$, $VN_{i,j} = D(t)_{i,j}$ and $VS_{i,j} = 0$. When $D(t)_{i,j} > N$, $VN_{i,j} = 0$ and $VS_{i,j} = D(t)_{i,j}$. Finally, motion intensity S of the to-be-processed block may be calculated by using the following Formula (7):

$$S = \frac{\sum\limits_{i=1}^{h}\sum\limits_{i=1}^{w} VS_{i,j}}{\sum\limits_{i=1}^{h}\sum\limits_{i=1}^{w} VN_{i,j}} \quad S = \frac{\sum\limits_{i=1}^{h}\sum\limits_{j=1}^{w} VS_{i,j}}{\sum\limits_{i=1}^{h}\sum\limits_{j=1}^{w} VN_{i,j}} \tag{7}$$

5. Determine a target interval to which the motion intensity belongs from a plurality of motion intensity intervals, and determine filter coefficient description information corresponding to the target interval as filter coefficient description information matching the motion intensity.

The filter coefficient description information is obtained in advance through the following operations and is stored in a form of a table:

5.1. Divide a motion intensity distribution range, to obtain a plurality of motion intensity intervals.

5.2. Determine a pixel difference distribution range; and determine, based on each motion intensity interval, target filter coefficients under a plurality of pixel differences in the pixel difference distribution range.

The pixel difference distribution range is [0, 255], and the plurality of pixel differences in the pixel difference distribution range are various integer values in [0, 255]. When the target filter coefficient is determined, it is ensured that the filter coefficient is negatively correlated with the pixel difference, and a degree of change of the filter coefficient is positively correlated with a motion intensity value in the motion intensity interval.

5.3. Multiply each target filter coefficient by a corresponding pixel difference, to obtain a filter coefficient representation value under each pixel difference.

5.4. Establish a correspondence between each filter coefficient representation value and a corresponding pixel difference.

5.5. Form filter coefficient description information by using correspondences of filter coefficient representation values determined based on a same motion intensity interval, to obtain filter coefficient description information corresponding to each motion intensity interval.

The filter coefficient description information may be stored in a form of a table, and the pixel difference is used as an index value of the table. For details, refer to the foregoing Table 2.

6. Obtain a target pixel difference between each pixel point in the current to-be-processed block and a pixel point at a corresponding position in a reference image, and use each target pixel difference as an index value, to query, from the filter coefficient description information matching the motion intensity of the current to-be-processed block, a target filter coefficient representation value that has a correspondence with each target pixel difference.

The reference image is an intermediate processed image corresponding to a video frame at a moment t−1 (that is, a previous frame), that is, an image obtained by performing time domain filtering on the to-be-processed image when the video frame at the moment t−1 is used as the to-be-processed image. In this embodiment, a time domain filtering process uses recursive filtering. For each frame of video frame, after an intermediate processed image outputted through time domain filtering is obtained by using the image noise reduction method provided in some embodiments, the intermediate processed image is saved as a reference image of a next frame of video frame.

7. For each pixel point in the current to-be-processed block, subtract, when the pixel value of the pixel point is greater than or equal to the pixel value of the pixel point at the corresponding position in the reference image, the target filter coefficient representation value from the pixel value of the pixel point, to obtain a time domain filtering result of the pixel point; and add, when the pixel value of the pixel point is less than or equal to the pixel value of the pixel point at the corresponding position in the reference image, the pixel value of the pixel point to the target filter coefficient representation value, to obtain the time domain filtering result of the pixel point.

8. Determine, based on a time domain filtering result of each pixel point, intermediate processed data obtained by performing time domain filtering on the current to-be-processed block.

9. Combine intermediate processed data of each to-be-processed block, and perform spatial noise reduction on intermediate processed data obtained through combination, to obtain target luma data corresponding to the to-be-processed image.

Because no time domain noise reduction processing is performed on a to-be-processed block whose luma mean is greater than a preset luma threshold, intermediate processed data is original luma channel data of the to-be-processed block.

It may be understood that, an image formed by the intermediate processed data obtained through combination is the intermediate processed image corresponding to the to-be-processed image, and the intermediate processed image may be saved as a reference image of a next frame of to-be-processed image.

10. Combine and convert the target luma data, and U-channel data and V-channel data of the to-be-processed image into RGB data, to obtain a target noise reduction image.

In some embodiments, in another application scenario, the image noise reduction method is applied to a video live streaming application program, to perform noise reduction processing on a video frame in a live streaming process. The computer device may sequentially use, starting from a second frame, video frames in a video frame sequence acquired in the live streaming process as to-be-processed images. The image noise reduction method provided in some embodiments is performed on each to-be-processed image, to obtain a target noise reduction image, so that video visual quality in the live streaming process can be improved. In this embodiment, filter coefficient description information stores a correspondence between a filter coefficient and a pixel difference. For each pixel point in a to-be-processed block whose luma mean is greater than or equal to a preset luma mean, after a pixel difference corresponding to each pixel point is obtained, a computer device may query a target filter coefficient from filter coefficient description information matching motion intensity of the to-be-processed block, to calculate a time domain filtering result of each pixel point by using the foregoing Formula (1).

Based on some embodiments, it can be seen that, in the image noise reduction method, a to-be-processed image is divided into blocks, and statistics is collected on information such as luma, a motion degree, and noise intensity in each block, so that time domain filters with different intensity are used for different blocks, to achieve regional motion adaptive noise reduction. After time domain filtering, spatial guided filtering is performed on the image, to further eliminate residual noise, and retain edge information to avoid blurring. This can effectively resolve problems of motion smear and image blur after noise reduction with a low amount of calculation, achieving an excellent noise reduction effect. Some embodiments describing the noise reduction effect are provided.

In some embodiments, FIG. 9 is a schematic diagram of an effect of an image noise reduction method in some embodiments. (a) in FIG. 9 is a schematic diagram of an image before noise reduction, and (b) in FIG. 9 is a schematic diagram of the image before noise reduction. To better present the effect, part areas (areas within boxes in the original image) are enlarged in FIG. 9. It can be seen from FIG. 9 that, the image before noise reduction includes many noise particles, and after noise reduction processing is performed through the image noise reduction method provided in some embodiments, the particles are reduced, and the image becomes clear and smooth. In addition, through the image noise reduction method provided in some embodiments, a good noise reduction effect can be achieved in both a background area and a foreground area.

Figure 10:
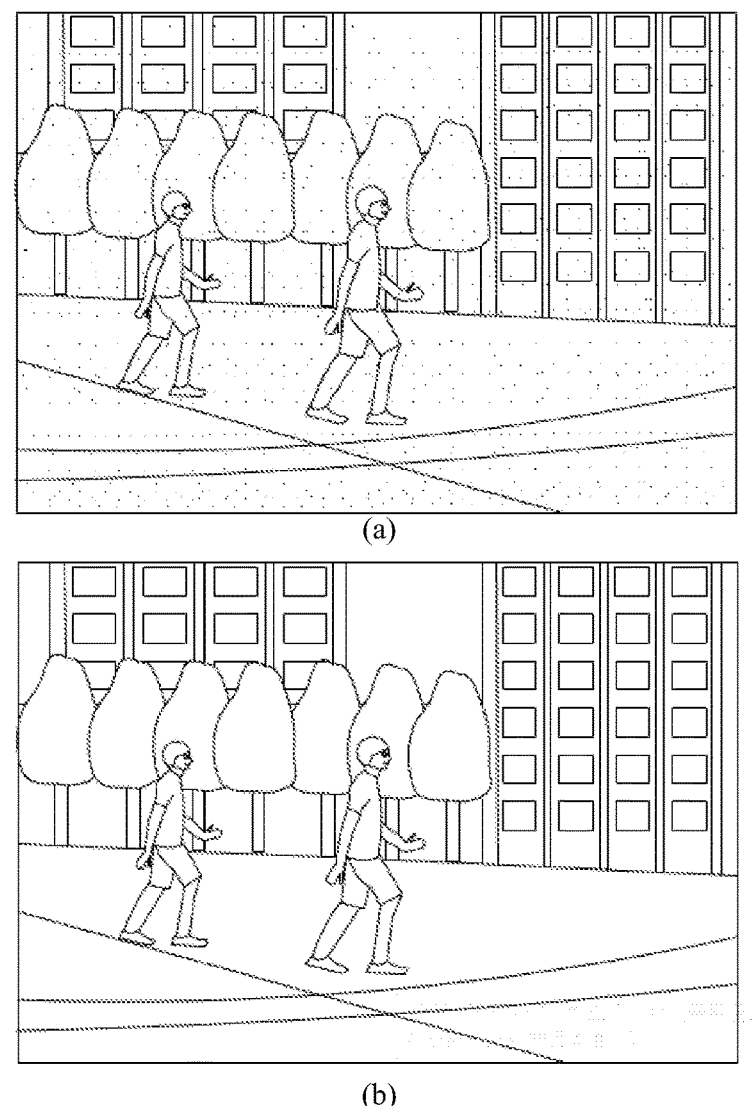
FIG. 10 is a schematic diagram of an effect of an image noise reduction method according to another embodiment.

In some embodiments, FIG. 10 is a schematic diagram of an effect of an image noise reduction method in some embodiments. (a) in FIG. 10 is a schematic diagram of an image before noise reduction, and (b) in FIG. 10 is a schematic diagram of the image before noise reduction. It can be seen from FIG. 10 that, the image before noise reduction includes noise points that frequently jitter, causing discomfort; and after noise reduction processing is performed through the image noise reduction method provided in some embodiments, the jitter points disappear.

Some embodiments provide an image noise reduction apparatus configured to implement the foregoing image noise reduction method and a filter data processing apparatus configured to implement the foregoing filter data processing method.

Figure 11:
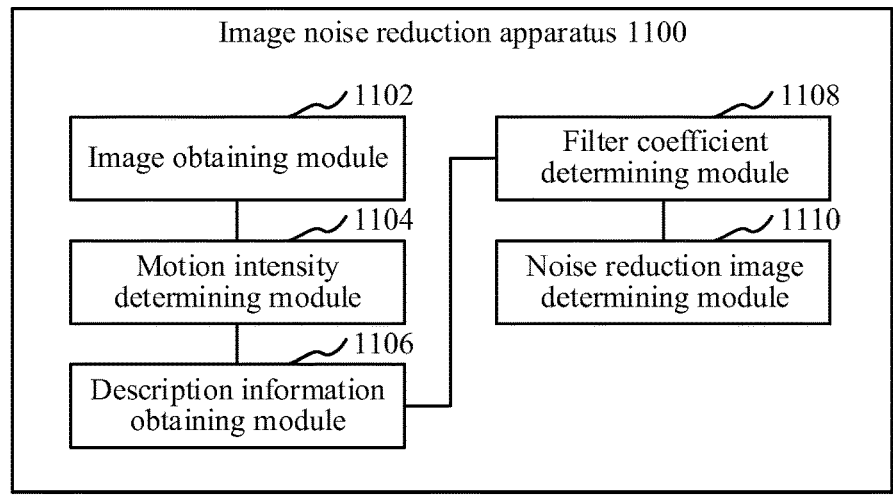
FIG. 11 is a structural block diagram of an image noise reduction apparatus in some embodiments.

In some embodiments, as shown in FIG. 11, an image noise reduction apparatus 1100 is provided, and includes:
an image obtaining module 1102, configured to obtain a to-be-processed image and a reference image;
a motion intensity determining module 1104, configured to determine motion intensity of a to-be-processed block in the to-be-processed image according to the reference image, the to-be-processed block being obtained by dividing the to-be-processed image;
a description information obtaining module 1106, configured to obtain filter coefficient description information matching the motion intensity, the filter coefficient description information being configured for describing a correspondence between a pixel difference and a filter coefficient representation value; and the filter coefficient representation value being negatively correlated with the pixel difference, and a degree of change of the filter coefficient representation value being positively correlated with the motion intensity;
a filter coefficient determining module 1108, configured to obtain a target pixel difference between a pixel point in the to-be-processed block and a pixel point at a corresponding position in the reference image, to determine, based on the filter coefficient description information, a target filter coefficient representation value that has a correspondence with the target pixel difference; and
a noise reduction image determining module 1110, configured to determine a target noise reduction image corresponding to the to-be-processed image based on the target filter coefficient representation value.

In the foregoing image noise reduction apparatus, because a to-be-processed block is obtained by dividing a to-be-processed image, different target filter coefficient representation values may be determined for different to-be-processed blocks in the to-be-processed image, and obtained target filter coefficient representation values may accurately match motion conditions of various areas in the image. In this way, a problem of a poor noise reduction effect in part areas caused when performing motion intensity estimation on the entire image is avoided, and a noise reduction effect of the to-be-processed image is improved. In addition, the target filter coefficient representation value is determined through filter coefficient description information, the filter coefficient description information is configured for describing a correspondence between a pixel difference and a filter coefficient representation value, the filter coefficient representation value is negatively correlated with the pixel difference, and a degree of change of the filter coefficient representation value is positively correlated with motion intensity. Therefore, for each pixel point, a target filter coefficient representation value matching the pixel point can be obtained, further improving the noise reduction effect of the to-be-processed image.

In some embodiments, the foregoing image noise reduction apparatus further includes: a description information determining module, configured to determine a plurality of pieces of reference motion intensity information, and determine a pixel difference distribution range; determine, based on each piece of reference motion intensity information, filter coefficient representation values under a plurality of pixel differences in the pixel difference distribution range; establish a correspondence between each filter coefficient representation value and a corresponding pixel difference; and form filter coefficient description information by using correspondences of filter coefficient representation values determined based on a same piece of reference motion intensity information, to obtain filter coefficient description information corresponding to each piece of reference motion intensity information; and the description information obtaining module 1106 is further configured to determine target motion intensity information matching the motion intensity from the plurality of pieces of reference motion intensity information, to determine filter coefficient description information corresponding to the target motion intensity information as the filter coefficient description information matching the motion intensity.

In some embodiments, the description information determining module is further configured to determine, based on each piece of reference motion intensity information, target filter coefficients under the plurality of pixel differences in the pixel difference distribution range; and multiply each target filter coefficient by a corresponding pixel difference, to obtain a filter coefficient representation value under each pixel difference; and the noise reduction image determining module is further configured to determine a time domain filtering result of the pixel point based on a size relationship between a pixel value of the pixel point and a pixel value of the pixel point at the corresponding position in the reference image, to determine the target noise reduction image corresponding to the to-be-processed image based on the time domain filtering result of the pixel point.

In some embodiments, the noise reduction image determining module is further configured to subtract, when the pixel value of the pixel point is greater than or equal to the pixel value of the pixel point at the corresponding position in the reference image, the target filter coefficient representation value from the pixel value of the pixel point, to obtain the time domain filtering result of the pixel point; and add, when the pixel value of the pixel point is less than or equal to the pixel value of the pixel point at the corresponding position in the reference image, the pixel value of the pixel point to the target filter coefficient representation value, to obtain the time domain filtering result of the pixel point.

In some embodiments, the description information determining module is further configured to divide a motion intensity distribution range into a plurality of motion intensity intervals, and use each motion intensity interval as one piece of reference motion intensity information; and the description information obtaining module 1106 is further configured to determine a target interval to which the motion intensity belongs from the plurality of motion intensity intervals, and determine filter coefficient description information corresponding to the target interval as the filter coefficient description information matching the motion intensity.

In some embodiments, the foregoing apparatus further includes a format conversion module, configured to convert three primary color channel data in the to-be-processed image into luma channel data, chroma channel data, and concentration channel data, and extract the luma channel data; and convert three primary color channel data in the reference image into luma channel data, chroma channel data, and concentration channel data, and extract the luma channel data; the motion intensity determining module is further configured to determine the motion intensity of the to-be-processed block according to the luma channel data of the reference image and luma channel data of the to-be-processed block; the filter coefficient determining module is further configured to obtain a pixel difference between the pixel point in the to-be-processed block and the pixel point at the corresponding position in the reference image under the luma channel data, to obtain the target pixel difference; and the noise reduction image determining module is further configured to determine, based on the target filter coefficient representation value, the target noise reduction image obtained by performing noise reduction processing on the luma channel data of the to-be-processed image.

In some embodiments, the noise reduction image determining module is further configured to determine, based on the target filter coefficient representation value, intermediate processed data obtained by performing time domain filtering on the luma channel data of the to-be-processed image; perform spatial noise reduction based on the intermediate processed data, to obtain target luma data corresponding to the to-be-processed image; and combine and convert the target luma data, and the chroma channel data and the concentration channel data of the to-be-processed image into three primary color channel data, to obtain the target noise reduction image.

In some embodiments, the foregoing apparatus further includes: a luma representation value determining module, configured to determine a luma representation value of the to-be-processed block based on the luma channel data of the to-be-processed block; enter, when the luma representation value is less than or equal to a preset luma threshold, the operation of determining the motion intensity of the to-be-processed block according to the luma channel data of the reference image and luma channel data of the to-be-processed block; and use, when the luma representation value is greater than the preset luma threshold, the luma channel data of the to-be-processed block as the intermediate processed data, and enter the operation of performing spatial noise reduction based on the intermediate processed data, to obtain target luma data corresponding to the to-be-processed image.

In some embodiments, the motion intensity determining module is further configured to determine a difference degree of the to-be-processed block relative to the reference image, and noise intensity of the to-be-processed block relative to the reference image; and determine the motion intensity of the to-be-processed block based on the difference degree and the noise intensity, the motion intensity being positively correlated with the difference degree, and the motion intensity being negatively correlated with the noise intensity.

In some embodiments, the motion intensity determining module is further configured to obtain a pixel difference of each pixel point in the to-be-processed block relative to a pixel point at a corresponding position in the reference image; determine a noise pixel point and a moving pixel point in the to-be-processed block based on the pixel difference corresponding to each pixel point, the moving pixel point being a pixel point with a pixel difference greater than a preset difference threshold, and the noise pixel point being a pixel point with a pixel difference less than or equal to the preset difference threshold; and collect statistics on a pixel difference of each noise pixel point to obtain the noise intensity, and collect statistics on a pixel difference of each moving pixel point to obtain the difference degree.

In some embodiments, the noise reduction image determining module is further configured to determine, based on the target filter coefficient representation value, an intermediate processed image obtained by performing time domain filtering on the to-be-processed image, to use the intermediate processed image as an input image and a guide image respectively; down-sample the input image to obtain a first sampled image, and down-sample the guide image to obtain a second sampled image; perform guided filtering on the first sampled image based on the second sampled image, to obtain a target image; and up-sample the target image according to a size of the input image, to obtain the target noise reduction image with a same size as the input image.

In some embodiments, the image obtaining module is further configured to determine a target video on which noise reduction is to be performed; use a video frame in the target video as a to-be-processed image, and determine a target video frame from a forward video frame corresponding to the to-be-processed image; and obtain a target noise reduction image corresponding to the target video frame, and determine the target noise reduction image corresponding to the target video frame as a reference image corresponding to the to-be-processed image.

Figure 12:
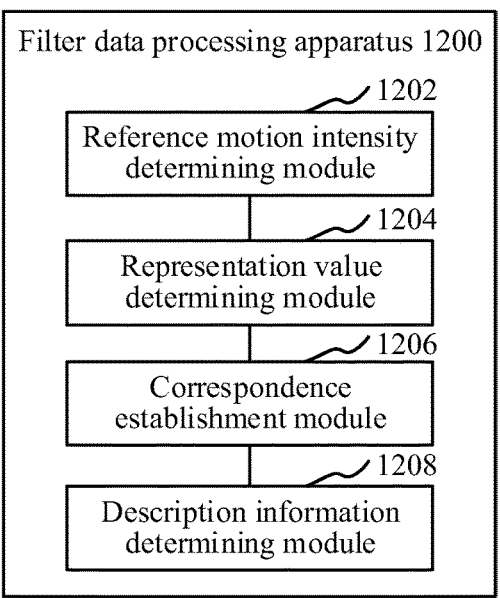
FIG. 12 is a structural block diagram of a filter data processing apparatus in some embodiments.

In some embodiments, as shown in FIG. 12, a filter data processing apparatus 1200 is provided, and includes:

a reference motion intensity determining module 1202, configured to determine a plurality of pieces of reference motion intensity information, and determine a pixel difference distribution range;

a representation value determining module 1204, configured to determine, based on each piece of reference motion intensity information, filter coefficient representation values under a plurality of pixel differences in the pixel difference distribution range;

a correspondence establishment module 1206, configured to establish a correspondence between each filter coefficient representation value and a corresponding pixel difference; and a description information determining module 1208, configured to form filter coefficient description information by using correspondences of filter coefficient representation values determined based on a same piece of reference motion intensity information, to obtain filter coefficient description information corresponding to each piece of reference motion intensity information, the filter coefficient description information being configured for performing time domain filtering on a to-be-processed image.

In the foregoing filter data processing apparatus, because filter coefficient description information describes a correspondence between a pixel difference and a filter coefficient representation value under each piece of reference motion intensity information, when time domain filtering is performed on a to-be-processed image, a pixel difference corresponding to a pixel point in the to-be-processed image may be directly used as an index, and a corresponding filter coefficient representation value may be queried from the filter coefficient description information. This avoids obtaining a filter coefficient through complex calculation, and improves filtering efficiency.

In some embodiments, the representation value determining module is further configured to determine, based on each piece of reference motion intensity information, target filter coefficients under the plurality of pixel differences in the pixel difference distribution range; and multiplying each target filter coefficient by a corresponding pixel difference, to obtain a filter coefficient representation value under each pixel difference.

A person skilled in the art would understand the above "modules" may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

The "modules" may also be implemented in software stored in a memory of a computer or a non-transitory computer-readable medium, where the instructions of each module are executable by a processor to thereby cause the processor to perform the respective operations of the corresponding module.

According to some embodiments, each module in the apparatus may exist respectively or be combined into one or more modules. Certain (or some) module in the modules may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In some embodiments, the apparatus may further include other units. In actual applications, these functions may also be realized cooperatively by the other units, and may be realized cooperatively by multiple units.

In some embodiments, a computer device is provided. The computer device may be a server, and an internal structure diagram thereof may be shown in FIG. 13. The computer device includes a processor, a memory, an input/output (I/O) interface, and a communication interface. The processor, the memory, and the input/output interface are connected via a system bus, and the communication interface is connected to the system bus via the input/output interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store data such as image data and filter coefficient description information. The input/output interface of the computer device is configured to exchange information between the processor and an external device. The communication interface of the computer device is configured to communicate with an external terminal through a network connection. The computer program is executed by the processor to implement an image noise reduction method or a filter data processing method.

In some embodiments, a computer device is provided. The computer device may be a terminal, and an internal structure diagram thereof may be shown in FIG. 14. The computer device includes a processor, a memory, an input/output interface, a communication interface, a display unit, and an input apparatus. The processor, the memory, and the input/output interface are connected via a system bus, and the communication interface, the display unit, and the input apparatus are connected to the system bus via the input/output interface. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The input/output interface of the computer device is configured to exchange information between the processor and an external device. The communication interface of the computer device is configured to communicate with an external terminal in a wired or wireless manner, and the wireless manner may be implemented through WIFI, a mobile cellular network, near field communication (NFC), or other technologies. The computer program is executed by the processor to implement an image noise reduction method or a filter data processing method. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 13:
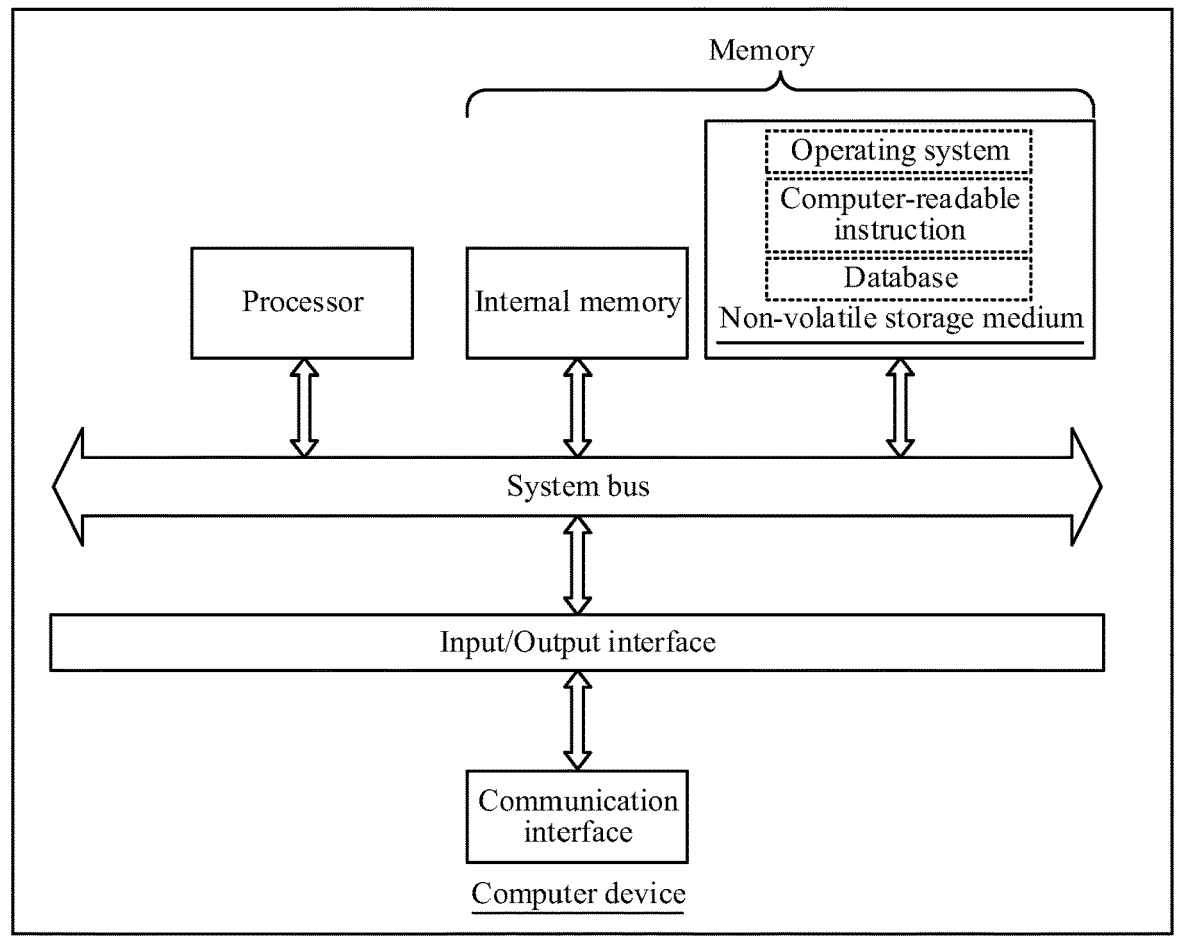
FIG. 13 is a diagram of an internal structure of a computer device in some embodiments.
Figure 14:
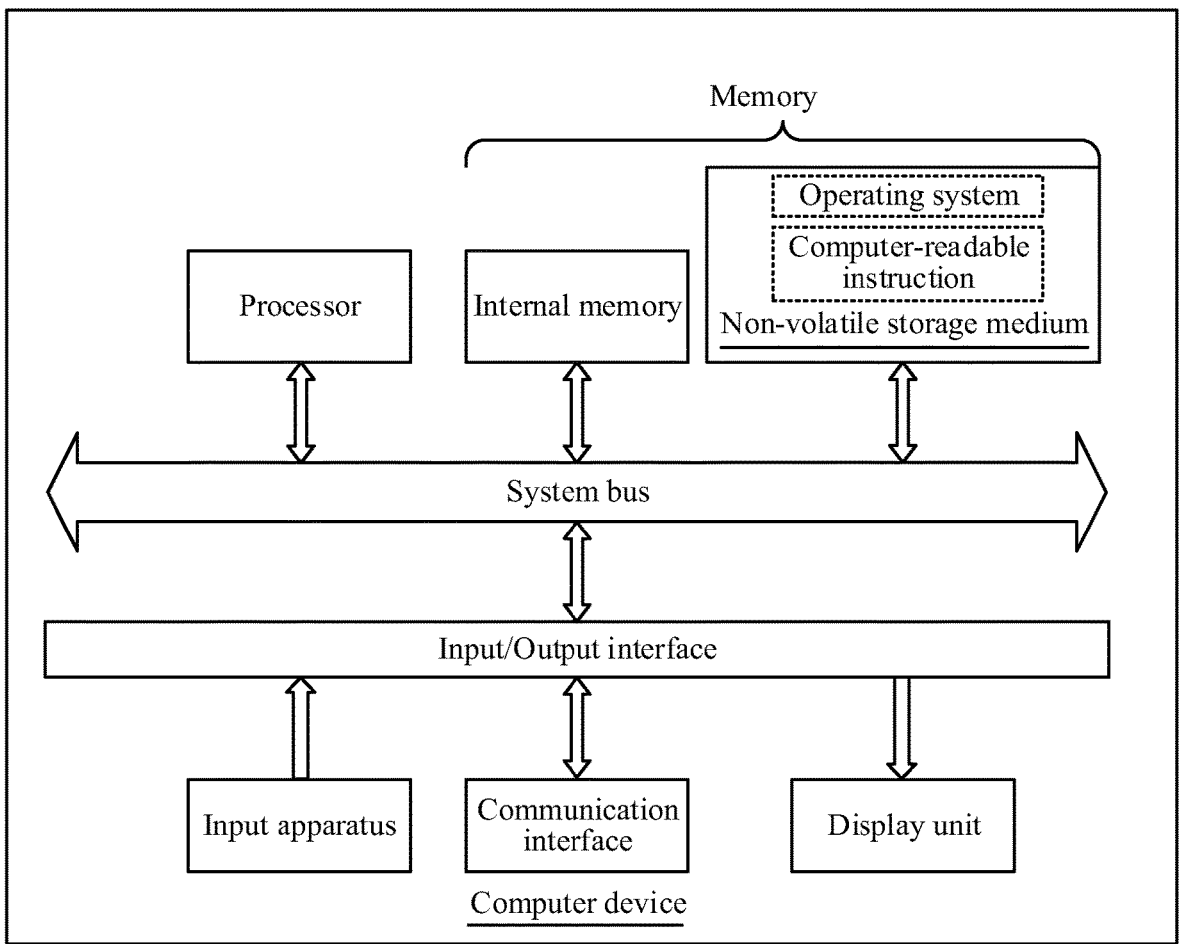
FIG. 14 is a diagram of an internal structure of a computer device in some embodiments.

A person skilled in the art may understand that, the structures shown in FIG. 13 and FIG. 14 are only block diagrams of part of structures related to the solutions and do not limit the computer device to which the solutions are applied. The computer device may include more or fewer components than those in the drawings, some components may be combined, or different component deployment may be used.

In some embodiments, a computer device is provided, including a memory and a processor, the memory storing a computer program, and the processor, when executing the computer program, implementing operations of the foregoing image noise reduction method or filter data processing method.

In some embodiments, a computer-readable storage medium is provided, having a computer program stored therein, the computer program, when executed by a processor, implementing operations of the foregoing image noise reduction method or filter data processing method.

In some embodiments, a computer program product is provided, including a computer program, the computer program, when executed by a processor, implementing operations of the foregoing image noise reduction method or filter data processing method.

User information (including but not limited to user device information, user personal information, and the like) and data (including but not limited to data used for analysis, stored data, displayed data, and the like) may be information and data authorized by a user or fully authorized by all parties, and collection, use, and processing of relevant data may need to comply with relevant laws, regulations, and standards of relevant countries and regions.

A person of ordinary skill in the art may understand that some or all procedures may be implemented by a computer program instructing related hardware. The computer program may be stored in a non-volatile computer-readable storage medium, and when the computer program is executed, the procedures of some embodiments may be performed. Any reference to a memory, a database, or another medium used in some embodiments may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external cache, or the like. For the purpose of description instead of limitation, the RAM is available in a plurality of forms, such as a static RAM (SRAM) or a dynamic RAM (DRAM). The database involved in some embodiments may include at least one of a relational database and a non-relational database. The non-relational database may include a block-chain-based distributed database, or the like, but is not limited thereto. The processor involved in some embodiments may be a general-purpose processor, a central processing unit, a graphics processor, digital signal processor, a programmable logic device, a quantum computing-based data processing logic device, or the like, but is not limited thereto.

Technical features of some embodiments may be combined in different manners to form other embodiments. However, the combinations of these technical features shall be considered as falling within the scope recorded by this specification.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. An image noise reduction method, performed by a computer device, the method comprising:
   obtaining a first image to be processed and a second image as a reference image;
   obtaining a block of the first image by dividing the first image;
   determining a motion intensity of the block of the first image based on the second image;
   obtaining filter coefficient description information matching the motion intensity based on:
      a first pixel difference of a first pixel point value of the first image and a second pixel point value of the second image, and
      a filter coefficient;
   obtaining a target pixel difference between a third pixel point value of the block of the first image and a fourth pixel point value of the second image;
   determining a target filter coefficient corresponding to the target pixel difference based on the filter coefficient description information; and
   determining a target noise reduction image of the first image based on the target filter coefficient,
   wherein the filter coefficient is negatively correlated with the first pixel difference,
   wherein a degree of change of the filter coefficient is positively correlated with the motion intensity, and
   wherein the filter coefficient is a value for representing the filter coefficient or is obtained by performing a calculation on the value for representing the filter coefficient.

2. The method according to claim 1,
   wherein the method further comprises:
      determining a plurality of reference motion intensity pieces from the second image;
      determining a pixel difference distribution range based on a first plurality of pixel differences;
      determining a plurality of filter coefficients of the first plurality of pixel differences based on the plurality of reference motion intensity pieces; and
      establishing a plurality of correspondences between the plurality of filter coefficients and the first plurality of pixel differences, and
   wherein the obtaining the filter coefficient description information comprises:
      determining a target motion intensity matching a reference motion intensity of the plurality of reference motion intensity pieces; and determining the filter coefficient description informa-
tion based on the target motion intensity as the filter
coefficient description information matching the
motion intensity.

3. The method according to claim 2,
wherein the determining the plurality of filter coefficients
comprises:
determining a plurality of target filter coefficients of the
first plurality of pixel differences in the pixel differ-
ence distribution range based on the plurality of
reference motion intensity pieces; and
obtaining the plurality of filter coefficients based on
multiplying the plurality of target filter coefficients
by the first plurality of pixel differences, and
wherein the determining the target noise reduction image
comprises:
determining a time domain filtering result of a fifth
pixel point value of the first image based on a size
relationship between the fifth pixel point value and a
sixth pixel point value of the second image; and
determining the target noise reduction image of the first
image based on the time domain filtering result of the
fifth pixel point value.

4. The method according to claim 3, wherein the deter-
mining the time domain filtering result comprises:
subtracting the target filter coefficient from the fifth pixel
point value, based on the fifth pixel point value being
greater than the sixth pixel point value, to obtain the
time domain filtering result of the fifth pixel point
value;
adding the fifth pixel point value to the target filter
coefficient, based on the fifth pixel point value being
less than the sixth pixel point value, to obtain the time
domain filtering result of the fifth pixel point value; and
subtracting the target filter coefficient from the fifth pixel
point value or adding the fifth pixel point value to the
target filter coefficient based on the fifth pixel point
value being equal to the sixth pixel point value, to
obtain the time domain filtering result of the fifth pixel
point value.

5. The method according to claim 2,
wherein the determining the plurality of reference motion
intensity pieces comprises:
dividing a motion intensity distribution range into a
plurality of motion intensity intervals; and
determining the plurality of reference motion intensity
pieces based on the plurality of motion intensity
intervals,
wherein the determining the target motion intensity com-
prises determining a target interval of the motion inten-
sity based on the plurality of motion intensity intervals,
and
wherein the determining the filter coefficient description
information further comprises determining the filter
coefficient description information based on the target
interval.

6. The method according to claim 1,
wherein before the determining motion intensity of the
block of the first image, the method further comprises:
converting first color channel data of the first image
into a first luma channel, a first chroma channel, and
a first concentration channel;
extracting the first luma channel;
converting second color channel data of the second
image into a second luma channel, a second chroma
channel, and a second concentration channel; and extracting the second luma channel;
wherein the determining the motion intensity of the block
of first image comprises determining the motion inten-
sity of the block of the first image based on the first
luma channel and the second luma channel,
wherein the obtaining the target pixel difference com-
prises obtaining a second pixel difference between the
third pixel point value and a seventh pixel point value
of the second luma channel, to obtain the target pixel
difference, and
wherein the determining the target noise reduction image
comprises determining the target noise reduction image
by performing noise reduction processing on the first
luma channel based on the target filter coefficient.

7. The method according to claim 6, wherein the deter-
mining the target noise reduction image by performing noise
reduction processing on the first luma channel comprises:
determining intermediate processed data by performing
time domain filtering on the first luma channel based on
the target filter coefficient;
obtaining target luma data of the first image by perform-
ing spatial noise reduction based on the intermediate
processed data; and
obtaining the target noise reduction image by combining
and converting the target luma data, the first chroma
channel, and the first concentration channel into third
color channel data.

8. The method according to claim 7, wherein the method
further comprises:
determining a luma representation value of the block of
the first image based on a third luma channel of the
block of the first image,
wherein the determining the motion intensity of the block
of the first image based on the first luma channel and
the second luma channel is performed based on the
luma representation value being less than or equal to a
preset luma threshold, and
wherein the obtaining the target luma data of the first
image is performed based on the luma representation
value being greater than the preset luma threshold.

9. The method according to claim 1, wherein the deter-
mining motion intensity of the block in the first image based
on the second image comprises:
determining a degree of difference of the block of the first
image and the second image;
determining a noise intensity of the block of the first
image based on the second image; and
determining the motion intensity of the block of the first
image based on the degree of difference and the noise
intensity,
wherein the motion intensity is positively correlated with
the degree of difference, and
wherein the motion intensity is negatively correlated with
the noise intensity.

10. The method according to claim 9, further comprising:
obtaining a second plurality of pixel differences of a first
plurality of pixel point values of the block of the first
image and a second plurality of pixel point values of the
second image;
determining a noise pixel point and a moving pixel point
of the block of the first image based on the second
plurality of pixel differences,
wherein the moving pixel point has a third pixel difference
greater than a preset difference threshold,
wherein the noise pixel point has a fourth pixel difference
less than or equal to the preset difference threshold, wherein the determining the noise intensity comprises obtaining a third plurality of pixel differences of a plurality of noise pixel points, and wherein the determining the degree of difference comprises obtaining a fourth plurality of pixel differences of a plurality of moving pixel points.

11. The method according to claim 1, wherein the determining the target noise reduction image comprises:

determining an intermediate processed image based on time domain filtering on the first image based on the target filter coefficient;

generating an input image and a guide image from the intermediate processed image;

down-sampling the input image to obtain a first sampled image;

down-sampling the guide image to obtain a second sampled image;

obtaining a target image by performing guided filtering on the first sampled image based on the second sampled image; and up-sampling the target image based on a first size of the input image so that the target noise reduction image has a second size matching the first size.

12. The method according to claim 1, wherein the obtaining the first image and the second image comprises:

determining a target video on which noise reduction is to be performed;

determining the first image based on a video frame of the target video;

determining a target video frame from a forward video frame based on the first image;

obtaining an initial target noise reduction image of the target video frame; and determining the second image based on the initial target noise reduction image.

13. An image noise reduction apparatus, comprising:

at least one memory configured to store computer program code;

at least one processor configured to read the program code and operate as instructed by the program code, the program code comprising:

image obtaining code configured to cause at least one of the at least one processor to obtain a first image to be processed and a second image as a reference image;

motion intensity determining code configured to cause at least one of the at least one processor to:

obtain a block of the first image by dividing the first image; and determine motion intensity of the block of the first image based on the second image;

description information obtaining code configured to cause at least one of the at least one processor to obtain filter coefficient description information matching the motion intensity;

filter coefficient determining code configured to cause at least one of the at least one processor to:

obtain a target pixel difference between a third pixel point value of the block of the first image and a fourth pixel point value of the second image; and determine a target filter coefficient corresponding to the target pixel difference based on the filter coefficient description information; and noise reduction image determining code configured to cause at least one of the at least one processor to determine a target noise reduction image of the first image based on the target filter coefficient, wherein the filter coefficient description information is based on:

a first pixel difference of a first pixel point value of the first image and a second pixel point value of the second image, and a filter coefficient, wherein the filter coefficient is negatively correlated with the first pixel difference, wherein a degree of change of the filter coefficient is positively correlated with the motion intensity, and wherein the filter coefficient is a value for representing the filter coefficient or is obtained by performing a calculation on the value for representing the filter coefficient.

14. The image noise reduction apparatus according to claim 13, wherein the program code further comprises reference motion intensity determining code configured to cause at least one of the at least one processor to:

determine a plurality of reference motion intensity pieces from the second image;

determine a pixel difference distribution range based on a first plurality of pixel differences;

determine a plurality of filter coefficients of the first plurality of pixel differences based on the plurality of reference motion intensity pieces;

establish a plurality of correspondences between the plurality of filter coefficients and the first plurality of pixel differences, and wherein the description information obtaining code is further configured to cause at least one of the at least one processor to:

determine a target motion intensity matching a reference motion intensity of the plurality of reference motion intensity pieces; and determine the filter coefficient description information based on the target motion intensity as the filter coefficient description information matching the motion intensity.

15. The image noise reduction apparatus according to claim 14, wherein the reference motion intensity determining code is further configured to cause at least one of the at least one processor to:

determine the plurality of filter coefficients of the first plurality of pixel differences in the pixel difference distribution range comprises:

determine a plurality of target filter coefficients of the first plurality of pixel differences in the pixel difference distribution range based on the plurality of reference motion intensity pieces; and obtain the plurality of filter coefficients based on multiplying the plurality of target filter coefficients by the first plurality of pixel differences, and wherein the noise reduction image determining code is further configured to cause at least one of the at least one processor to:

determine a time domain filtering result of a fifth pixel point value of the first image based on a size relationship between the fifth pixel point value and a sixth pixel point value of the second image; and determine the target noise reduction image of the first image based on the time domain filtering result of the fifth pixel point value.

16. The image noise reduction apparatus according to claim 15, wherein the noise reduction image determining code is further configured to cause at least one of the at least one processor to:

based on the fifth pixel point value being greater than the sixth pixel point value, subtract the target filter coefficient from the fifth pixel point value to obtain the time domain filtering result of the fifth pixel point value;

based on the fifth pixel point value being less than the sixth pixel point value, add the fifth pixel point value to the target filter coefficient to obtain the time domain filtering result of the fifth pixel point value; and based on the fifth pixel point value being equal to the sixth pixel point value, subtract the target filter coefficient from the fifth pixel point value or add the fifth pixel point value to the target filter coefficient to obtain the time domain filtering result of the fifth pixel point value.

17. A non-transitory computer-readable storage medium, storing computer code which, when executed by at least one processor, causes the at least one processor to at least:

obtain a first image to be processed and a second image as a reference image;

obtain a block of the first image by dividing the first image;

determine motion intensity of the block of the first image based on the second image;

obtain filter coefficient description information matching the motion intensity;

obtain a target pixel difference between a third pixel point value of the block of the first image and a fourth pixel point value of the second image;

determine a target filter coefficient corresponding to the target pixel difference based on the filter coefficient description information; and determine a target noise reduction image of the first image based on the target filter coefficient, wherein the filter coefficient description information is based on:

a first pixel difference of a first pixel point value of the first image and a second pixel point value of the second image, and a filter coefficient, wherein the filter coefficient is negatively correlated with the first pixel difference, wherein a degree of change of the filter coefficient is positively correlated with the motion intensity, and wherein the filter coefficient is a value for representing the filter coefficient or is obtained by performing a calculation on the value for representing the filter coefficient.

18. The non-transitory computer-readable storage medium according to claim 17, further comprising:

determining a plurality of reference motion intensity pieces from the second image;

determining a pixel difference distribution range based on a first plurality of pixel differences;

determining a plurality of filter coefficients of the first plurality of pixel differences, based on the plurality of reference motion intensity pieces; and establishing a plurality of correspondences between the plurality of filter coefficients and the first plurality of pixel differences, wherein the obtaining the filter coefficient description information comprises:

determining a target motion intensity matching a reference motion intensity of the plurality of reference motion intensity pieces; and determining the filter coefficient description information based on the target motion intensity as the filter coefficient description information matching the motion intensity.

19. The non-transitory computer-readable storage medium according to claim 18, wherein the determining the plurality of filter coefficients comprises:

determining a plurality of target filter coefficients of the first plurality of pixel differences in the pixel difference distribution range based on the plurality of reference motion intensity pieces; and obtaining the plurality of filter coefficients based on multiplying the plurality of target filter coefficients by the first plurality of pixel differences, and wherein the determining the target noise reduction image comprises:

determining a time domain filtering result of a fifth pixel point value of the first image based on a size relationship between the fifth pixel point value and a sixth pixel point value of the second image; and determining the target noise reduction image of the first image based on the time domain filtering result of the fifth pixel point value.

20. The non-transitory computer-readable storage medium according to claim 19, wherein the determining the time domain filtering result comprises:

subtracting the target filter coefficient from the fifth pixel point value, based on the fifth pixel point value being greater than the sixth pixel point value, to obtain the time domain filtering result of the fifth pixel point value;

adding the fifth pixel point value to the target filter coefficient, based on the fifth pixel point value being less than the sixth pixel point value, to obtain the time domain filtering result of the fifth pixel point value; and subtracting the target filter coefficient from the fifth pixel point value or adding the fifth pixel point value to the target filter coefficient based on the fifth pixel point value being equal to the sixth pixel point value, to obtain the time domain filtering result of the fifth pixel point value.

* * * * *